Jan. 5, 1937.   E. M. BOUTON ET AL   2,066,908
ELEVATOR SYSTEM
Original Filed Aug. 30, 1934    10 Sheets-Sheet 1

WITNESSES:
E. A. McCloskey
Birney Hines

INVENTORS
Edgar M. Bouton and
Harold W. Williams.
BY
ATTORNEY

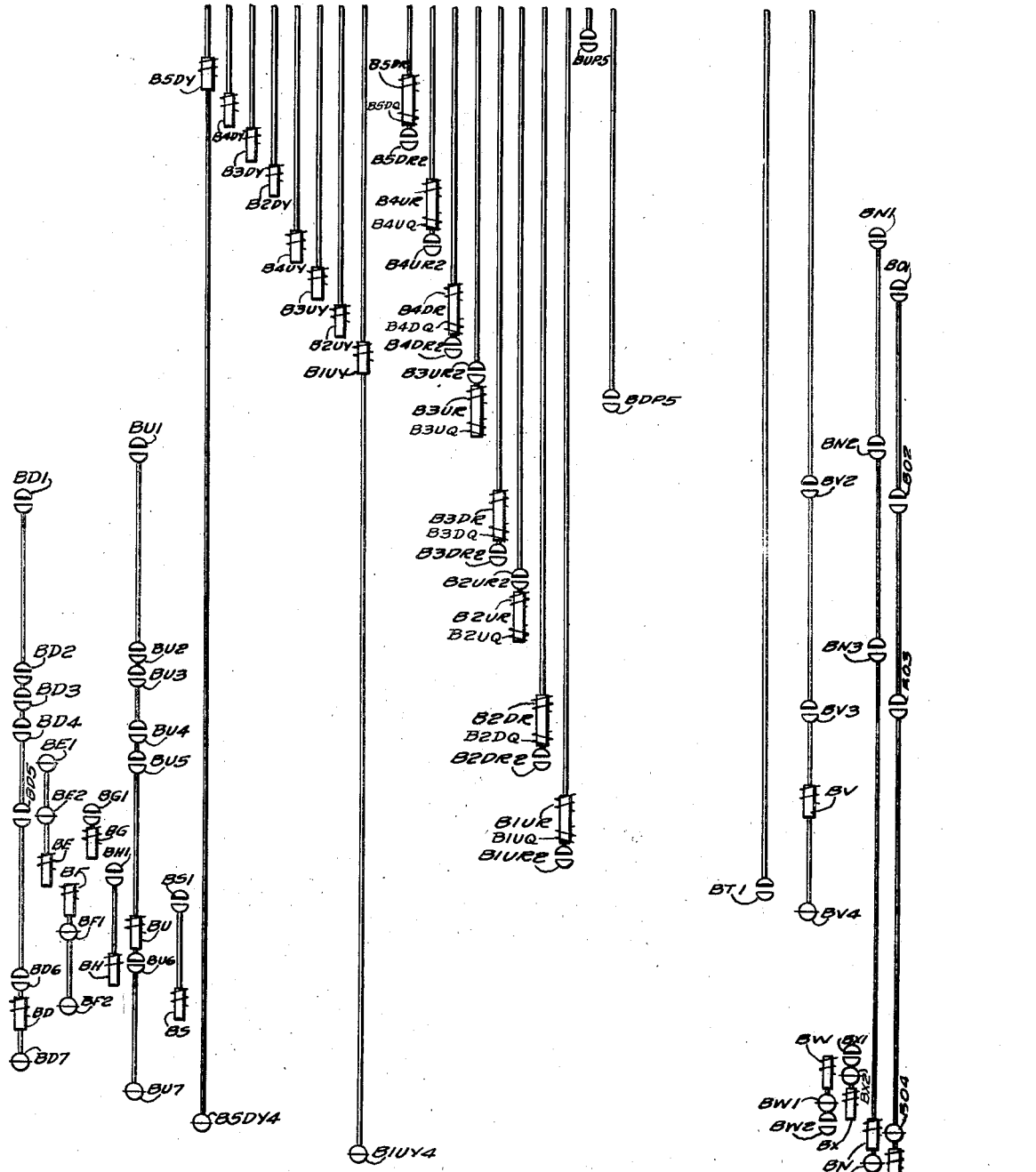

Patented Jan. 5, 1937

2,066,908

UNITED STATES PATENT OFFICE 2,066,908

ELEVATOR SYSTEM

Edgar M. Bouton and Harold W. Williams, Chicago, Ill., assignors to Westinghouse Electric Elevator Company, Chicago, Ill., a corporation of Illinois Application August 30, 1934, Serial No. 742,112
Renewed July 31, 1936

46 Claims. (Cl. 187—29)

Our invention relates to signal and control systems for elevators and more particularly to the signal and control systems for operating a bank of elevator cars.

One object of our invention is to provide a signal and control system which will promote the answering of calls and the loading and unloading of passengers in a most prompt and efficient manner.

Another object is to provide an elevator system in which each car has its own stopping button at each floor, and means for indicating which button should be operated to stop the next approaching car for either the up direction or the down direction.

A further object is to provide an elevator system in which a single stop button for each car at each floor may be employed for both the up and the down direction instead of the usual up button and down button.

Another object is to provide an elevator signal and control system having an individual stopping button for each car at each floor which shall be simple and inexpensive in construction and which may be easily and quickly and inexpensively installed, operated and maintained in service.

It is also an object to provide a system in which the operation of an indicated button at a floor will cause the floor lantern corresponding to the button and to the direction indicated to be lighted immediately, thereby indicating the hatchway door at which the next car in the corresponding direction will stop.

In order to accomplish these and other objects, we have provided an elevator system embodying a group of cars and a signal and control system therefor including the following characteristics and functions.

Each car in the bank may be started by start buttons within the car and may be stopped by means of stop push buttons in the car or by means of stop push buttons at the floor landing, there being only one stop push button at each floor landing for each car.

An indicating means operated by the cars is provided for telling the passenger at a floor which button to press for stopping the next up or the next down car. The indicating means is provided in the form of illuminated arrows and each button has one of the illuminated up arrows and one of the illuminated down arrows. The up arrow at the button corresponding to the next up car is lighted to indicate that that button should be pressed to stop the next up car at that floor, and the arrow at the button corresponding to the next down car is lighted to indicate to the waiting passenger that that button should be operated to stop the next down car.

For a better understanding of our invention, reference may be had to the accompanying drawings, in which.

Figure 1:
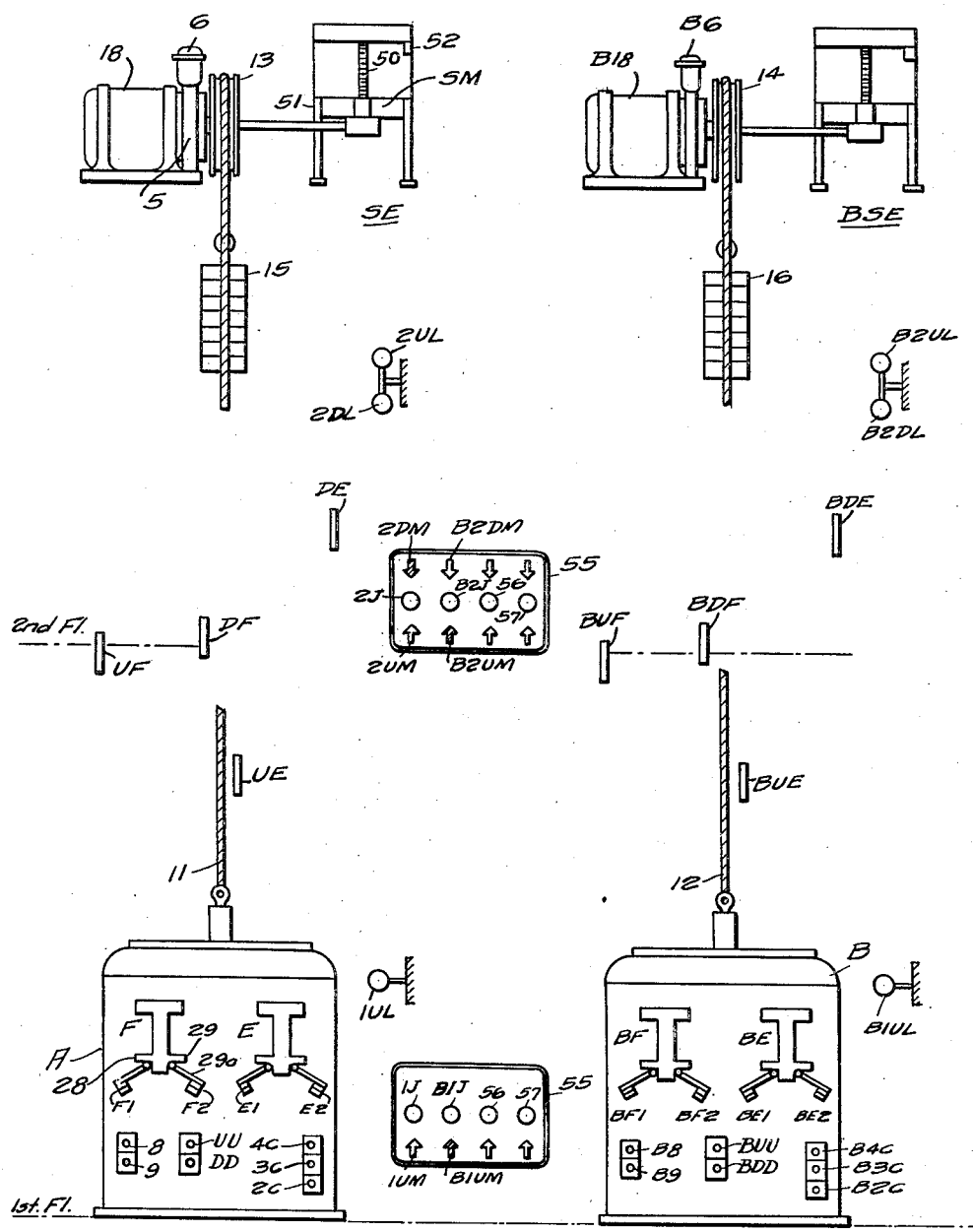
Figure 1 is a diagrammatic representation of an elevator installation embodying our improved signal and control system.

Figs. 3, 4, 5 and 6 collectively constitute a diagrammatic representation, in what is known as the straight line style, of the signal and control systems for operating the elevator cars shown in Fig. 1; and Figs. 3A, 4A, 5A and 6A collectively constitute an explanatory illustration of the relays embodied in Figs. 3, 4, 5 and 6.

The Figs. 3A, 4A, 5A and 6A illustrate the relays with their coils and contact members disposed in horizontal alignment with their positions in the straight-line circuits of Figs. 3, 4, 5 and 6, to enable the reader to readily determine the identification of any relay, the number and kind of its contact members and the position of its coil and its contact members in the straight line circuits.

Figure 3:
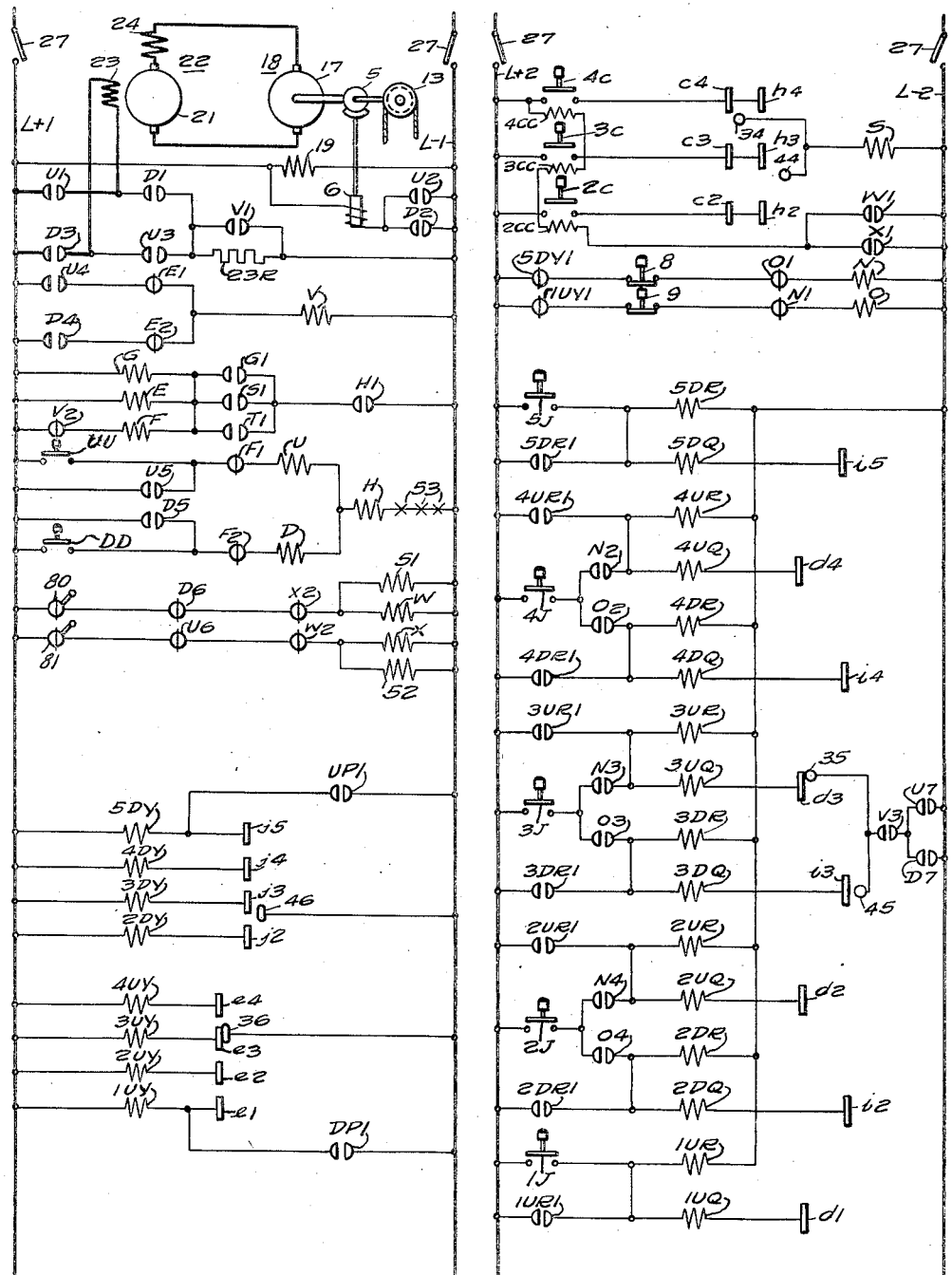
Figure 3A:
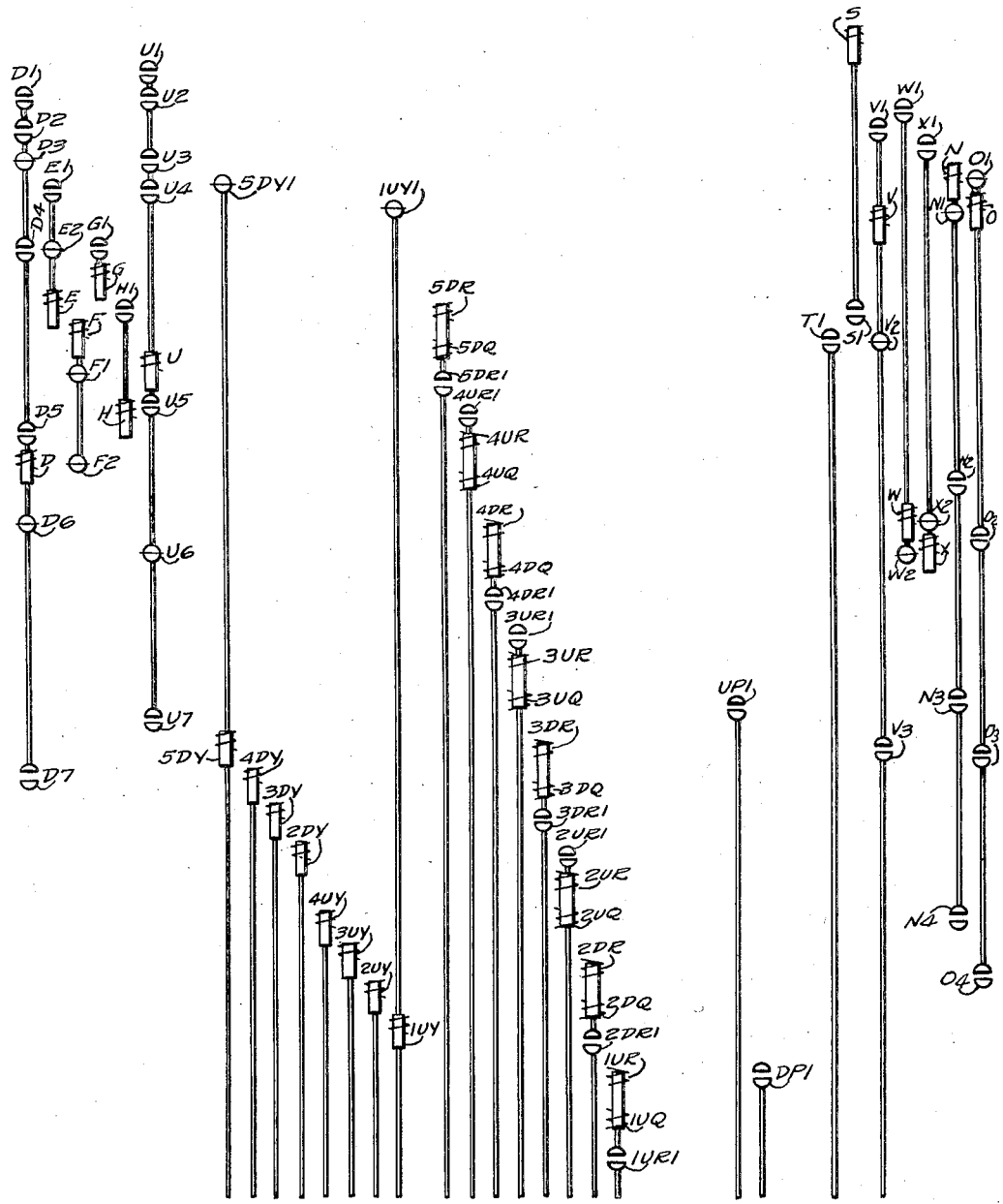
Figure 4:
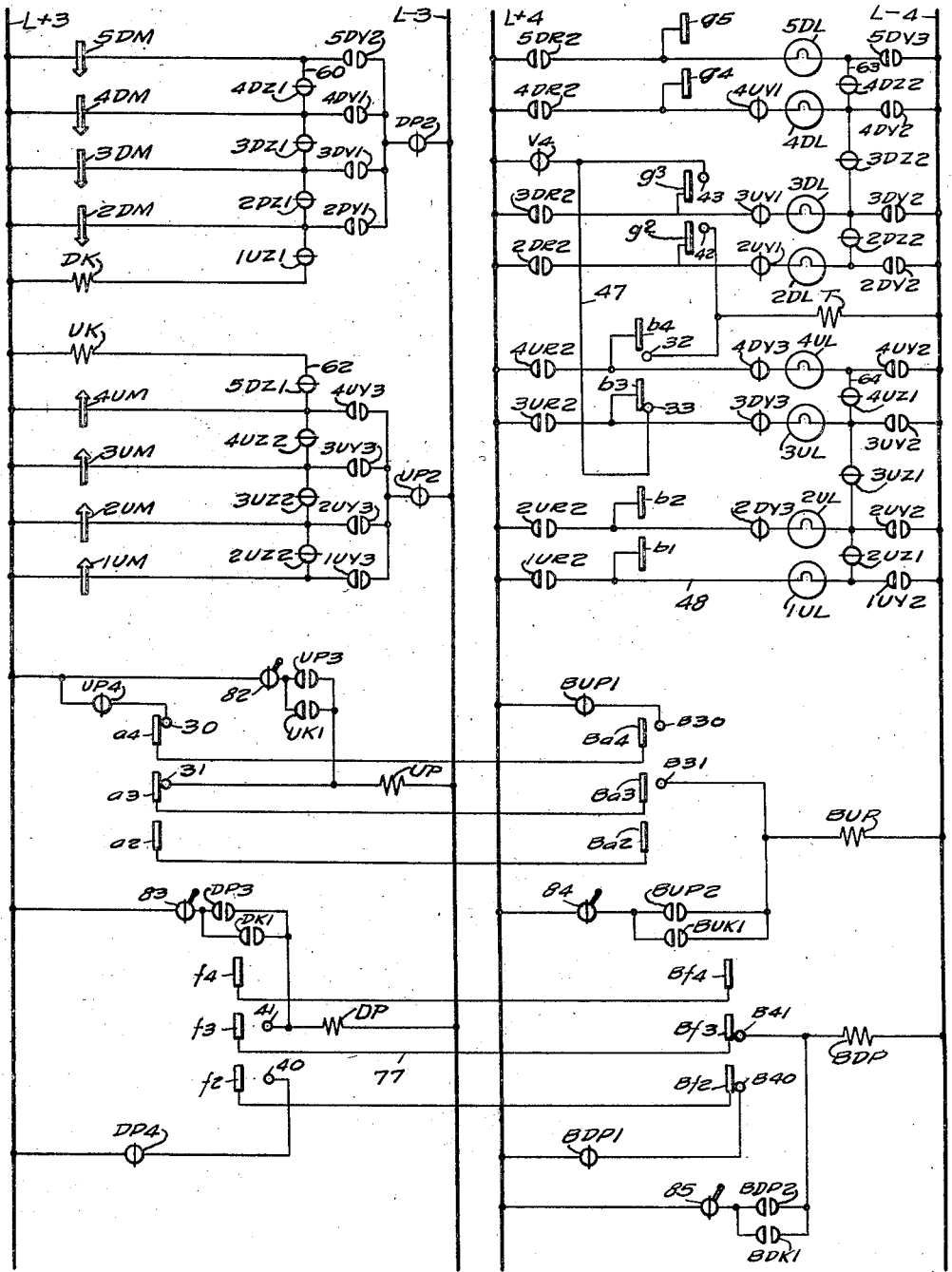
Figure 4A:
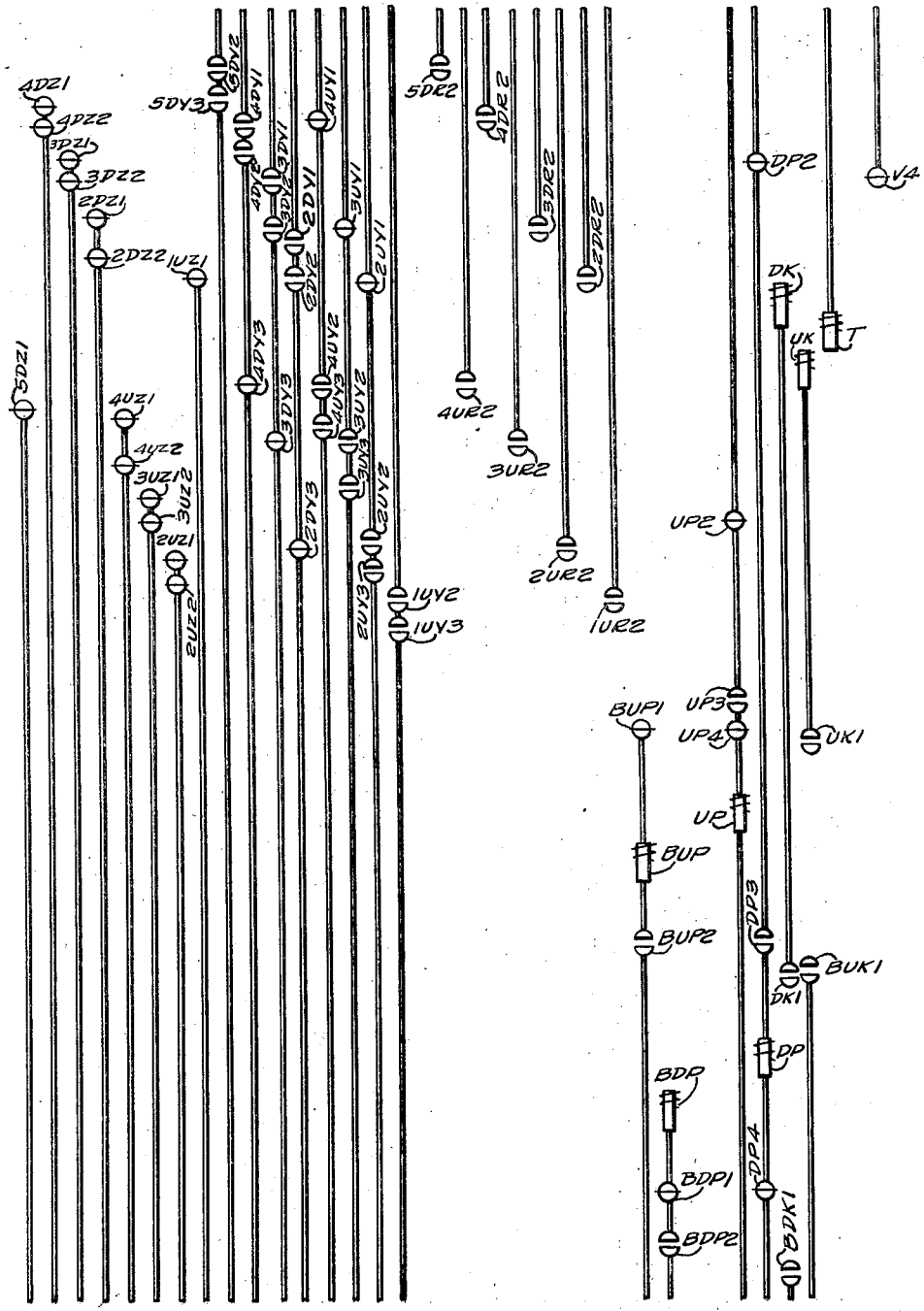
Figure 5:
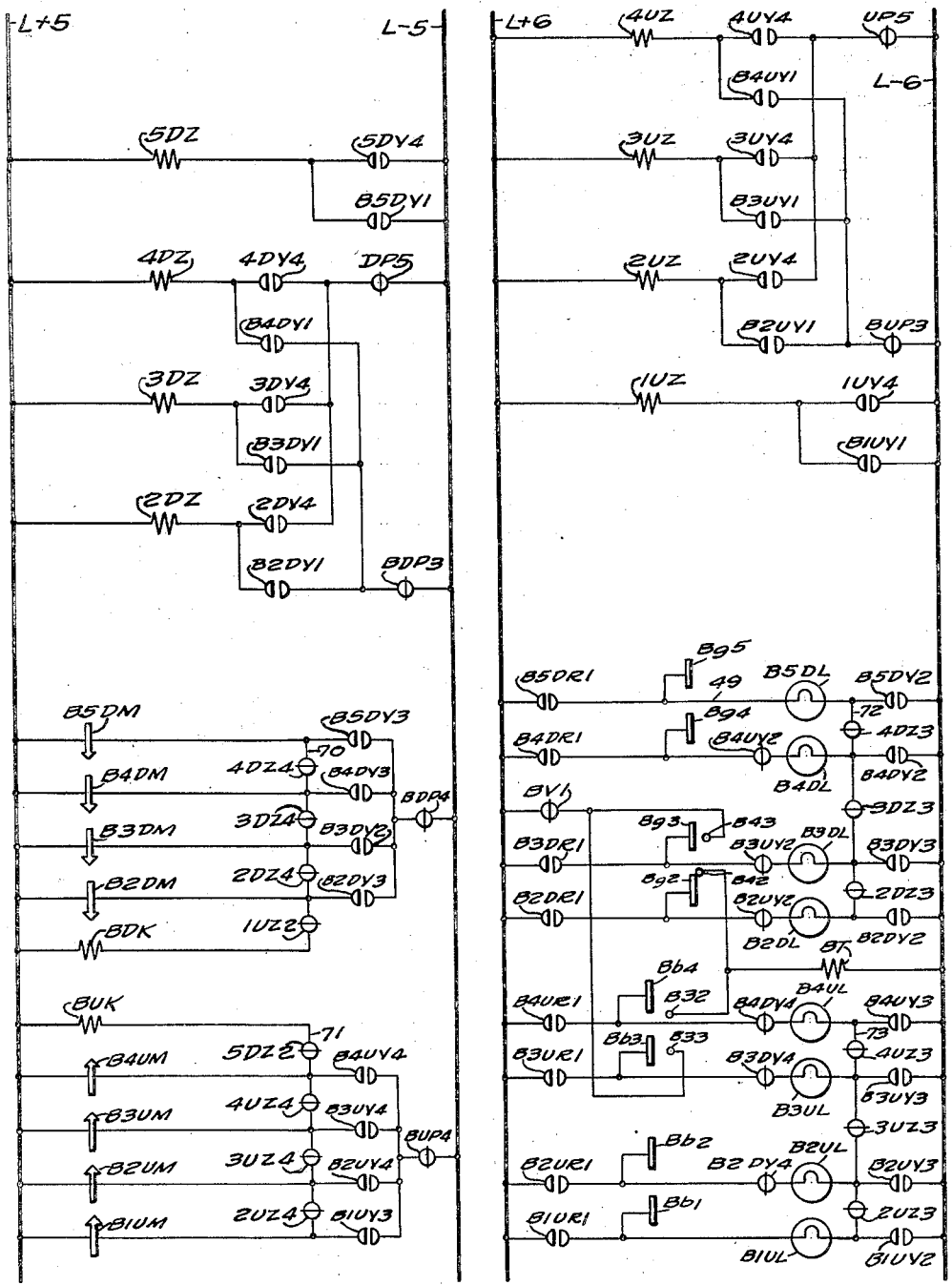
Figure 5A:
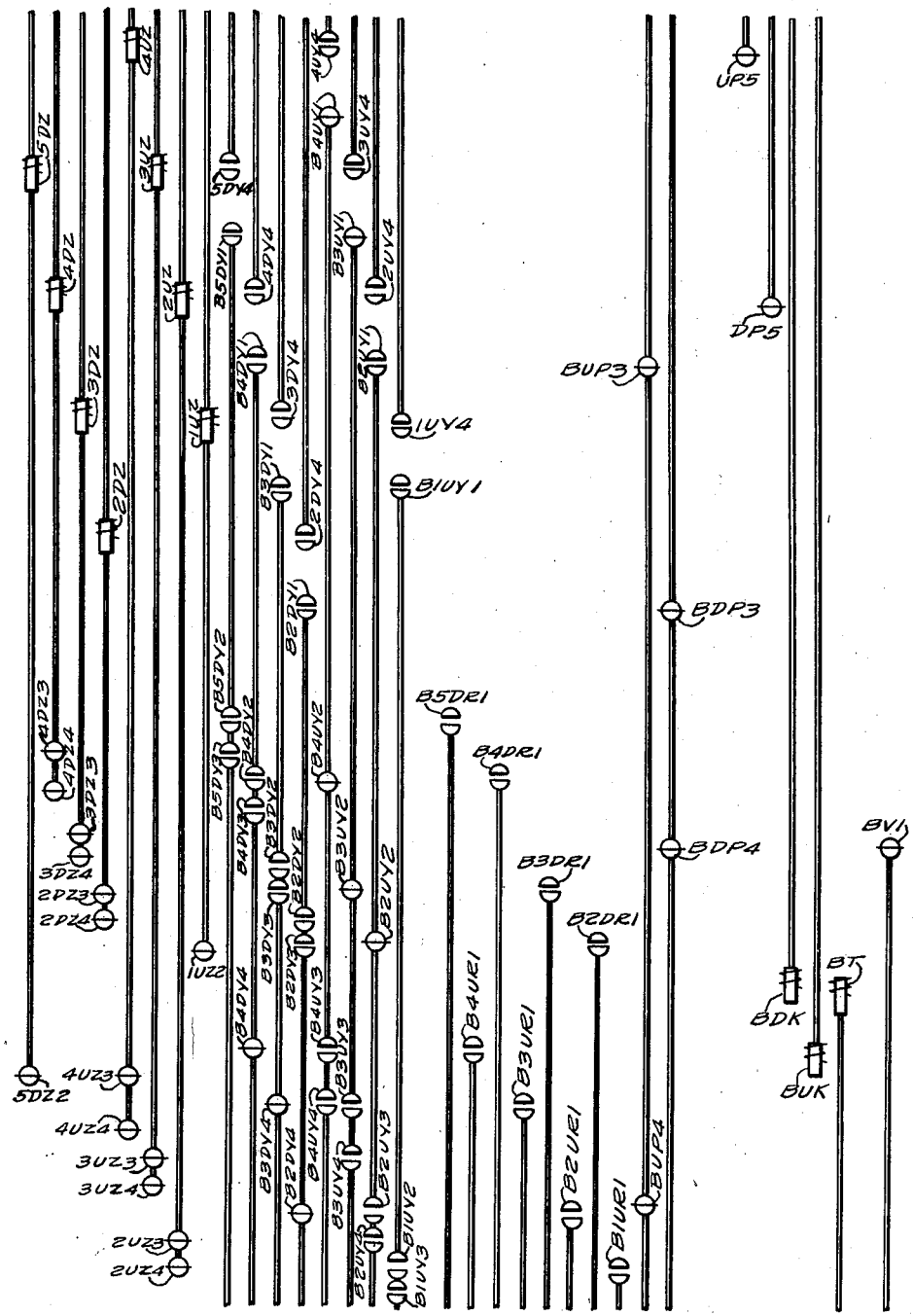
Figure 6:
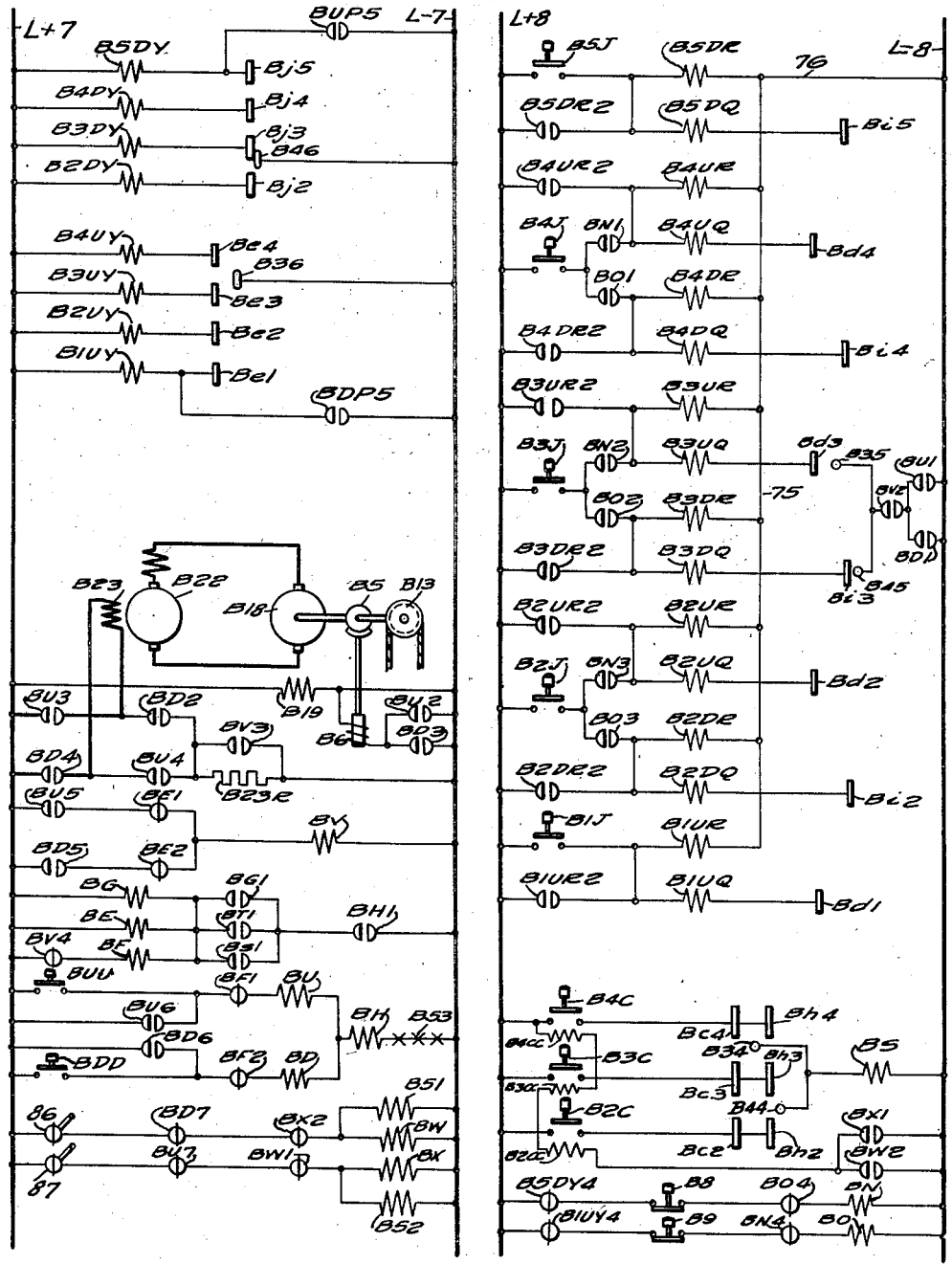

For convenience in reading the drawings, Fig. 4 should be placed under Fig. 3, Fig. 5 under Fig. 4, and Fig. 6 under Fig. 5; Fig. 3A beside Fig. 3, Fig. 4A beside Fig. 4 and under Fig. 3, Fig. 5A beside Fig. 5 and under Fig. 4A, and Fig. 6A beside Fig. 6 and under Fig. 5A.

Also, for convenience, the main relays included in the system are designated as follows:

C=Stop push buttons in car A.
CC=Holding coils for stop buttons in car A.
D=Down direction switch for car A.
DD=Down direction starting button in car A.
E=Inductor relay for decelerating car A.
F=Inductor relay for stopping car A.
G=Inductor maintaining relay for car A.
H=Inductor restoring relay, car A.
J=Floor push buttons for car A.
K=Terminal zone-modifying relays.
L=Floor lanterns for car A.
M=Indicating arrows at floor buttons.
N=Up direction relays.
O=Down direction relays.

P=Automatic by-pass relays.
Q=Cancellation coils on floor call registering relays.
R=Registering relays for car A floor buttons.
S=Car button stopping relay for car A.
T=Floor button stopping relay for car A.
U=Up direction switch for car A.
UU=Up direction starting button in car A.
V=High speed relay for car A.
W=Up direction preference relay for car A.
X=Down direction preference relay for car A.
Y=Zone feeding relays for car A.
Z=Zone relays common to all cars.

Referring more particularly to the drawings, we have illustrated an elevator installation including two cars A and B for serving five floors or landings. The cars are indicated as suitably suspended by hoisting cables 11 and 12 which pass over hoisting drums 13 and 14 to suitable counterweights 15 and 16, respectively.

Although we have illustrated only two cars, the signal and control system therefor as applied to only five floors, it is to be understood that the system is equally applicable to any desired number of cars serving any number of floors.

The relays for car B are given the same designation as those for car A with the letter B prefixed thereto; the letters "U" and "D" indicate up and down directions; the prefix numerals indicate the floors, and the suffix numerals indicate the contact members of the relays. For example, B3UR indicates the up direction stop call registering relay for the third floor for car B and B3UR1 indicates one pair of contact members operated by that relay.

Referring to the control system for car A, as shown in Fig. 3, the hoisting drum 13 is directly coupled to armature 17 of a suitable hoisting motor 18, the field winding 19 of which is connected, for constant voltage energization, to supply conductors L+1 and L−1, which may be connected to a suitable source of electric energy (not shown) by suitable switches 21.

A variable voltage system control may be provided for operating the hoisting motor 18 in which the armature 17 is connected in a closed circuit with the armature 21 of a generator 22. The generator is provided with a separately excited field winding 23 and a cumulative series field winding 24. A resistor 23R is connected in the circuit of the separately excited field winding 23 for controlling the speed of the generator. The armature 21 of the generator may be driven by any suitable driving motor (not shown).

A brake 5 operated by a brake magnet 6 is provided for applying a braking effect to the hoisting drum 13 when the car is brought to a stop, the brake magnet 6 being energized to release the brake 5 when the car is running and being deenergized to apply the brake 5 when the supply of power to the car is cut off.

The direction and speed of the hoisting motor 18 may be suitably controlled by controlling the direction and the value of the excitation current that is supplied to the separately excited field winding 23 of the generator 22.

The direction of excitation current for the field winding 23 may be suitably controlled by means of an up direction switch U and a down direction switch D, while the value of the current supplied to the field winding may be controlled by means of a high speed relay V which controls the resistor 23R.

The operation of the up direction and the down direction switches U and D, as well as the high speed relay V, may be controlled by means of an up push button UU and a down push button DD mounted in the car in position to be actuated by the car attendant when he desires to start the car.

Any suitable means may be employed for automatically stopping the car A level with the floors it serves. As an example of such means, we have illustrated an automatic inductor relay landing system similar to that disclosed in Patent No. 1,884,446, issued October 25, 1932 to K. M. White and G. K. Hearn, and assigned to the Westinghouse Electric Elevator Company.

The landing system for car A includes a decelerating inductor relay E and a stopping inductor relay S for causing the car to be automatically decelerated from its high speed and brought to a stop at an exact level with the floor. The decelerating inductor relay E is mounted on the car A in position to cooperate with an inductor plate UE for the up direction, and an inductor plate DE for the down direction. The stopping inductor relay F is mounted on the car A in position to cooperate with an inductor plate UF for the up direction and an inductor plate DF for the down direction. The inductor plates are constructed of magnetic material and are mounted in the hatchway in such position as to cooperate with and open the contact members of the inductor relays on the car when the relays are in an energized condition as the car approaches a stop at a landing.

For simplicity, only one set of inductor plates for one floor has been shown, but it will be understood that a set similar to that shown may be provided for each floor served by the car intermediate the upper terminal landing and the lower terminal landing. If desired, a set of inductor plates corresponding to the inductor plates UE and UF may be provided for the upper terminal floor and a set corresponding to inductor plates DE and DF may be provided for the lower terminal floor.

As shown, each inductor relay is provided with two sets of contact members. For an "up" stop, the contact members E1 of the relay E cooperate with the inductor plate UE in decelerating the car, and the contact members F1 cooperate with the inductor plate UF in stopping the car after it is decelerated. For the down direction, the contact members E2 of relay E cooperate with the inductor plate DE to decelerate the car and the contact members F2 cooperate with the inductor plate DF in stopping the car.

The contact members of the inductor relays just described are so connected with the car control circuits that, when the inductor relays are energized to decelerate and stop the car at the floor represented by the inductor plates in the down direction, the contact members E2 pass the inductor plate DE and are thereby opened to decelerate the car, and as the contact members F2 come opposite the inductor plate DF they open to stop the car level with the floor. The contact members E1 of relay E and the contact members F1 of the relay F are opened by the inductor plates UE and UF respectively, when the stop is to be made in the up direction.

The inductor relays are of the self-holding type, that is, when they are energized but have not yet come opposite an inductor plate, the contact members remain closed, but when the relay comes opposite an inductor plate, the contact members adjacent that plate move to an open position and are held in such open position until the inductor relay is deenergized. The means for holding the contact members in the open position on inductor relay E, for instance, are the extended portions 28 and 29 (Fig. 1).

It will be seen that when the inductor relay E passes the down inductor plate DE in an energized condition, the contact members E2 will be opened, and the arm 29a will be moved upwardly to such a position that they would be attracted and held by the magnetized projection 29. Therefore, the opened contact members remain open and do not reclose after passing the inductor plate to complicate the operation of the control system. However, we do not desire to be limited to inductor relays of this particular type because inductor relays with temporary opening contact members, which are well known in the art, may be employed just as readily if the motor control system is adjusted to cooperate with them.

When the inductor relays are energized to slow down the car to a stop, it is desired to maintain them in that condition until they are operated to bring the car to rest. A slow-down holding relay G is provided for this purpose.

When the inductor relays are energized for a stop, they remain energized until restored even though their contact members are operated by passage near the inductor plates. Therefore, an inductor restoring relay H is provided for deenergizing the inductor relays of car A after a stop has been made and also for so interlocking them that they can be energized only while the car is moving.

In the elevator system illustrated in the drawings, the energization of the inductor relays on car A for decelerating and stopping that car at the floor is effected either by a car button stopping relay S or by a floor button stopping relay T. The energization of either of these relays will, as the car nears a floor at which a stop is to be made, energize the inductor relays on that car and thereby cause it to decelerate and stop at that floor.

The car button stopping relay S is controlled by a plurality of push buttons in the car, one for each of the intermediate floors. The pressing of a car button by a car attendant will register a stop call, or in other words, initiate and maintain a circuit which will be completed as the car arrives within a predetermined distance of the floor corresponding to the button and thereby energize the stopping relay S, which will, in turn, energize the inductor relays to stop the car at that floor. In this manner, the car may be stopped at any intermediate floor by pressing the push button in the car for that floor.

The push buttons mounted in car A for operation by the car attendant when he desires to register stop calls to stop the car at the floors where passengers desire to get off, are designated as 2C, 3C and 4C for the second, third and fourth floors, respectively, no button being necessary for the lower terminal floor, and the upper terminal floor, because the car will be stopped thereat by the usual well known limit switches (not shown) as it approaches its terminals.

Associated with the respective car push buttons are car push button holding or registering coils 2CC, 3CC and 4CC. These coils operate to hold the car push buttons in a depressed position after they are pressed by the car attendant in making stops from within the car. The coils are deenergized when the car reaches the terminals to then release the buttons for the next direction of operation.

An up direction preference relay W and a down direction preference relay X are provided for controlling the energization and deenergization of the car button holding coils CC. These relays are operated by limit switches at the terminal floors or by a change in the direction of operation of the up direction or down direction switches for the car.

The floor button stopping relay T is controlled by a suitable control device, such as a push button switch at each floor landing. The pressing of a push button at a floor for car A initiates a circuit which will be completed as the car nears that floor and thereby energize its stopping relay T to energize the inductor relays and thereby stop the car at such floor.

The push buttons for car A disposed at the floor landings to enable waiting passengers to stop the car are designated as 1J, 2J, 3J, 4J and 5J. The buttons for car B are designated as B1J, B2J, B3J, B4J and B5J.

Associated with the floor push buttons for car A are relays for maintaining the circuits initiated by the floor push buttons until the stopping relay T is energized. Inasmuch as these relays hold a stop call set up by the floor push buttons until the car answers the call, they are named registering relays. An up registering relay 1UR is associated with button 1J. An up registering relay 2UR and a down registering relay 2DR are associated with button 2J. An up registering relay 3UR and a down registering relay 3DR are associated with button 3J. An up registering relay 4UR and a down registering relay 4DR are associated with button 4J. A down registering relay 5DR is associated with button 5J.

A cancelling coil is also mounted upon the body of each of the registering relays for the purpose of deenergizing it at the time the call is answered. The cancellation coils are designated as 1UQ for relay 1UR, 2DQ for relay 2DR, 2UQ for relay 2UR, 3DQ for relay 3DR, 3UQ for relay 3UR, 4DQ for relay 4DR, 4UQ for relay 4UR and 5DQ for relay 5DR.

A pair of direction relays are provided for preparing or so controlling the registering relays that only the up registering relays can be operated by the floor buttons while the car is ascending and only the down registering relays can be operated by the floor buttons while the car is descending. The up direction relay is designated by the letter N and the down direction by the letter O. (Fig. 3.)

The direction relays N and O are normally controlled by the automatic operation of the zone feed relays 5DY or 1UY at the terminal floors. However, if the car is reversed while operating between terminals, the relays N and O may be reversed by momentarily opening the push button switch 8 or 9 according to the direction of operation.

Inasmuch as each car has its own button at each floor, we have provided for the buttons a plurality of indicators such as indicating arrows arranged to be illuminated to inform the waiting passenger which button should be pressed to stop the nearest approaching car in the direction in which he desires to go. Although an up arrow and a down arrow are provided for each button at each intermediate floor, only one button for each direction will be indicated by the lighting of its arrow. Hence, when a passenger approaches the push button panel and desires to go to an upper floor, he will press the button indicated by the illuminated up direction arrow. Thereby the passenger will stop the nearest approaching car going up. Likewise, if a passenger desires to go to a lower floor, he will press the button indicated by the illuminated down direction arrow and thereby stop the nearest approaching down car.

The up direction arrows for car A are designated as 1UM, 2UM, 3UM, and 4UM for the first, second, third, and fourth floors. The down arrows are indicated as 5DM, 4DM, 3DM, and 2DM for the down direction at the fifth, fourth, third, and second floors. The direction arrows for car B are given the same designation with the letter B prefixed thereto.

In order that a waiting passenger at a floor may be informed or signaled, when he presses a floor push button, that his stop call has been registered and also the hatchway door at which the car approaching in the direction he desires to go will open for him, we have provided a plurality of signal devices, preferably electric lamps, which are mounted beside the hatchway doors at the floor landings and which are commonly termed floor lanterns. Each of the top and bottom floors is provided with a single floor lantern for each car but each of the intermediate floors is provided with a pair of lanterns for each car, one for indicating when the corresponding car is approaching in the down direction and will make a down stop at the floor and the other for indicating that the car is approaching in an up direction and will make an up stop.

The floor lanterns for car A (see Fig. 4), are designated as follows: The up floor lantern at the first, second, third and fourth floors as 1UL, 2UL, 3UL and 4UL; the down floor lanterns at the fifth, fourth, third and second floors as 5DL, 4DL, 3DL and 2DL.

For car B (see Fig. 5) the up floor lanterns at the first, second, third and fourth floors are designated as B1UL, B2UL, B3UL and B4UL, and the down floor lanterns at the fifth, fourth, third and second floors are designated as B5DL, B4DL, B3DL and B2DL.

When a passenger presses a floor button corresponding to an illuminated arrow, the floor lantern of the nearest approaching car in the direction he desires to go is lighted immediately to indicate the hatchway door at which that car will stop for him so that he may at once walk to that door and be ready to enter the car as soon as it stops and the door opens.

The direction arrows for any one car are arranged to be illuminated at all floors in advance of that car up to the floor corresponding to the car ahead; that is, the car provides ahead of itself, a signaling zone defined by its arrows to indicate to waiting passengers at the floors in that zone that that car is approaching and will stop for them if they will press the floor buttons indicated by the illuminated arrows for that direction.

In order to illuminate the arrows in the signal zone in advance of the car, we have provided a plurality of zone relays (Fig. 5) designated as 1UZ, 2UZ, 3UZ and 4UZ for the up direction and as 5DZ, 4DZ, 3DZ and 2DZ for the down direction. These relays are common to both cars.

The zoning relays divide the complete round trip shaft travel of all cars into as many signal zones as there are cars operating and they then assign one zone to each car. The zone that is assigned to any one car is the zone in advance of that up to the next car ahead. The zone for each car is elastic and keeps moving along with the car, its end being determined by the position of the next car ahead.

In order to energize the zone relays and feed the zone circuit set up by them, we have provided a plurality of zone feeding relays. The zone feeding relays are individual to each car, that is, each car operates its own set of zone feeding relays for operating the zone relays which are common to both cars. The zone feeding relays energized sequentially by car A on its up trip are designated (see Fig. 3) as 1UY, 2UY, 3UY and 4UY. The zone feeding relays energized sequentially by car A on its down trip are designated as 5DY, 4DY, 3DY and 2DY.

The zone feeding relays are operated in accordance with the position of the cars. Therefore, they not only energize the zone relays and feed the zone circuits but they also assign the zones to the cars. Therefore, the indicating arrow for any one car and at each floor in front of that car up to the next car ahead will be kept lighted as the car moves along on its trip, the front or leading indicating arrows being lighted and the rear or following indicating arrows being extinguished as the car moves along.

A plurality of by-pass relays are provided for causing an overtaking car, when it approaches within one floor of an overtaken car, to relieve the overtaken car of the necessity of answering floor stop calls until it reaches the terminal toward which it is moving. The by-pass relays, when operated, lock in and the overtaken car is free of floor calls until it reaches its terminal, when the by-pass relays are automatically de-energized and the overtaken car again resumes its normal functions. The by-pass relays for car A are designated as UP for the up direction and DP for the down direction.

The push buttons and the indicating arrows therefor at each floor are mounted upon a push button panel 55. The panel should be placed in the position most convenient for operation by the waiting passengers. Two extra buttons 56 and 57 are provided in the panel for additional cars when needed.

Inasmuch as only one button is provided at each floor for each car, it is desirable, when a car is approaching a terminal at which no other car is parked, to prevent the lighting of both the up indicating arrow and the down indicating arrow for the one car. Otherwise, a waiting passenger would be confused because if he saw a button indicated by both a lighted up arrow and a lighted down arrow, he would not know which direction was meant.

In order to prevent situations of this kind from arising, we have provided a plurality of zone modifying relays which will, when a car approaches a terminal at which no other car is parked, extinguish the indicating arrows for the direction the car is going between itself and the terminal, light the indicating arrows for that car away from the terminal, and light the indicating arrows for the following car at all floors between the following car and the terminal. This allows the car nearest the terminal to go quickly to the terminal and start in the other direction. Also, it causes the lighting of the direction arrows for only one direction for each car at each floor and facilitates the operation of the cars.

The up direction zone modifying relay for car A at the upper terminal is indicated as UK and for the lower terminal as DK. When the transfer relays are used, the zone modifying relays are designed to accomplish their purpose by simply energizing a transfer relay as though a car had overtaken another car on its approach to a terminal.

In order that the various circuits for the push buttons, floor lanterns, relays, etc., may be connected in accordance with the position of the cars with respect to the floors past which they operate, car A is provided with floor selector SE (Fig. 1) and car B with floor selector BSE. The floor selectors may be of any suitable type such as are usually employed in elevator systems and may be located at any suitable point such for example as in the penthouse or in the elevator shaft.

Figure 2:
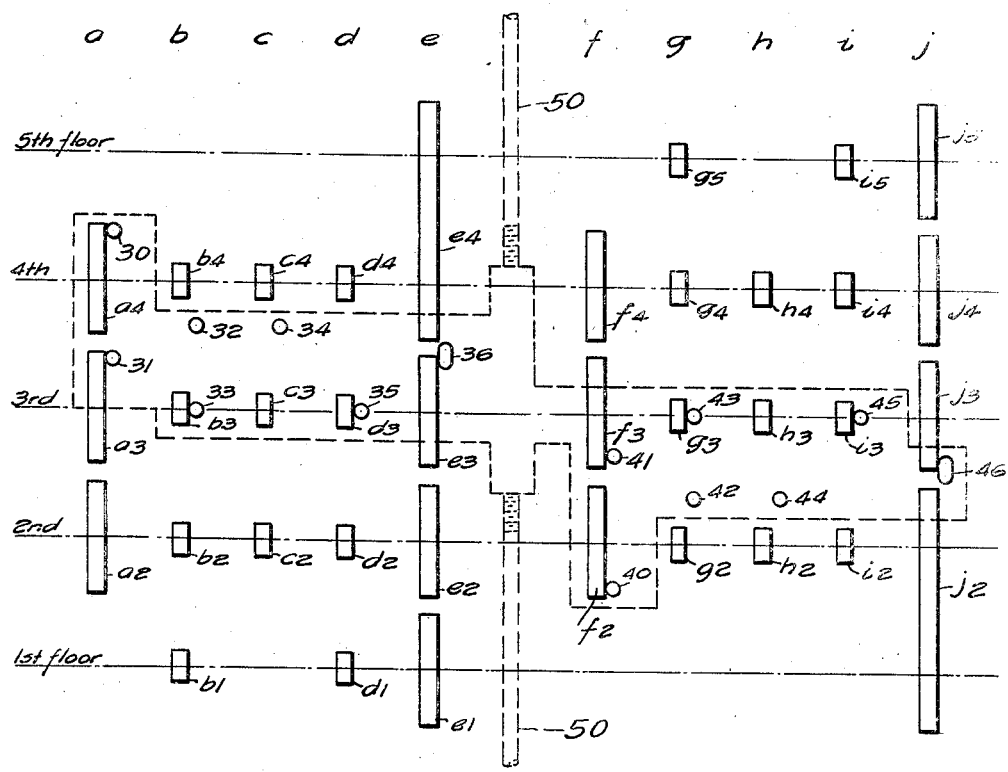
Fig. 2 is an enlarged representation of the contact segments and cooperating contact brushes on one of the floor selectors for one of the cars shown in Fig. 1, the brushes being shown in the position assumed when the car is stopped at the third floor.

The floor selector for car A is provided with a set of up contact segments as shown in Fig. 2 which are arranged according to the floors and are disposed to be engaged by cooperating contact brushes 30, 31, 32, 33, 34, 35 and 36 for the up direction and 40 to 46, inclusive, for the down direction. The brushes are mounted upon and insulated from a suitable arm SM.

The movable arm SM is operated in accordance with the movements of car A by means of screw shaft 50 driven by some part of the operating mechanism of the car. The frictional engagement between the arm SM at its operating screw 50 will cause the arm to move the up brushes to against the up contact segments when the car is traveling upwardly and against the down contact segments when the car is traveling downwardly, it being understood that the arm will tilt from one position to the other when the direction of operation of the car is reversed. For a more complete description of the type of floor selector here shown, reference may be had to the Smalley and Reiners Patent No. 634,220 of October 3, 1899.

However, in the present system when the car arrives at a terminal, it is desirable to have the arm SM tilted to the opposite direction as soon as the car comes into the terminal. For this reason, each selector is provided with a pair of electromagnets which tilt the selector arm to the up direction when the car arrives at the lower terminal and which tilt the arm to the down direction when the car arrives at the upper terminal. The electromagnets on the floor selector SE for car A (Figs. 1 and 3) are designated as 51 for the up and 52 for the down direction.

The group of contact segments designated as $a$ under the up brushes 30 and 31 complete the circuits for automatically by-passing the cars.

The group of contact segments designated as $b$ under the brushes 32 and 33 are energized when stop calls are registered on the floor stop buttons for the purpose of energizing the floor button stopping relay T to stop the car on its up trip.

The group of up contact segments $c$ under the brush 34 are energized by the pressing of the car buttons so that the approach of the car to the floor for which a car button has been pressed will cause the energization of the car button stopping relay A and thereby effect the stopping of the car at that floor.

The group of contact segments designated as $d$ serve to complete the circuits for cancelling stop calls registered on the floor relays.

The group of up contact segments designated as $e$ under the brush 36 serves to so connect the circuits to the up zone feeding relays as to energize these relays in accordance with the position of the car.

The contact segments on the down side of the floor selector are engaged by the down brushes 40 to 46, inclusive, when the car is descending and correspond to the contact segments just described for the up direction, those marked $f$ being for the automatic by-pass segments, $g$ the down floor button stopping segments, $h$ the down car button stopping segments, $i$ the floor button call cancelling segment, and $j$ the down zone feeding relay segments.

Inasmuch as the length of the contact segments and the sizes of the brushes will vary in accordance with the difference in height of the floors, speed of cars, etc. in different installations, it is impossible to give the exact dimensions of such segments and brushes in this application. However, with the aid of the illustration given in Fig. 2, anyone familiar with the elevator art should be able to arrange the contact segments and brushes on the floor selector to work in any particular installation after he has ascertained the desired characteristics of the system.

It should be noted that during the tilting of the selector arm SM, the circuits for the zone feeding relays should not be open. Therefore, the brushes 36 and 46 should be so mounted and supported on the arm that one will be engaged before the other is disengaged from its contact segments when the arm tilts.

Furthermore, each of the brushes 36 and 46 should be long enough to span the opening between adjacent contact segments in moving from one to the other, in order to prevent momentary deenergization of the zone feeding relays and consequently flickering of the indicating arrows.

It is believed that the invention may be understood best by an assumed operation of the system shown in the drawings.

It will be assumed that car A is standing at the lower terminal ready for an up trip, that car B is standing at the upper terminal ready for a down trip, and that the switches 27 (Fig. 3) are closed to connect the control circuits to a suitable source of electrical energy (not shown).

The closing of the switches 27 prepares cars A and B for operation by energizing the field winding 19 of the hoisting motor 18 of car A and the field winding B19 of the hoisting motor B18 of car B and also energizes the up direction preference relay W of car A, the down direction preference relay BX of car B, the up direction relay N of car A and the down direction relay BO of car B.

The circuit for the relay W of car A (Fig. 3) extends from the supply conductor L+1 through the limit switch 80, the contact members D6 and X2 and the coil of relay W to the supply conductor L—1. The circuit for the relay BX extends from the supply conductor L+7 (Fig. 6) through the limit switch 87, contact members BU7 and BW1 and the coil of relay BX to the supply conductor L—7. The circuit of relay N of car A extends from supply conductor L+2 (Fig. 3) through the contact members 5DY1, 8, O1 and the coil of relay N to the supply conductor L—2. The circuit of relay BO extends from the supply conductor L+8 (Fig. 6) through the contact members B1UY4, B9, BN4 and the coil of relay BO to the supply conductor L—8. The energization of the up direction preference relay W for car A and the up direction relay N for car A conditions car A for up direction operation; that is, the floor selectors and the floor button call registering relays of car A have been prepared for operation of that car in the up direction. The energization of the down direction relay BX and the auxiliary down direction relay BO for car B prepares the floor selector and the floor button registering relays of car B for the operation of car B in the down direction.

Inasmuch as car A is standing at the lower terminal, its high speed relay V is deenergized thereby closing its contact members V4, thereby energizing the floor lantern brush 33 (Fig. 4) to light the up floor lantern IUL for car A at the first floor by a circuit extending from the supply conductor L+4 through the contact members V4, conductor 47, brush 33, contact segment b1, conductor 48, lamp IUL and contact members IUY2 to the supply conductor L—4. The lighted up lantern IUL at the first floor at the hatchway door for car A indicates to waiting passengers that the car at that hatchway door is making an up trip.

Inasmuch as car B is standing at the upper terminal floor for the down trip, its high speed relay BV is deenergized. Hence its normally closed contact members BV1 energize the down floor lantern B5DL at the upper terminal for car B by a circuit extending from the supply conductor L+6 (Fig. 5) through the contact members BV1, brush B43, contact segment Bg5, conductor 49, lantern B5DL, contact members B5DY2 to the supply conductor L—6. The lighting of the lantern B5DL at the upper terminal of car B indicates to the waiting passengers on that floor that car B is on a down trip.

Inasmuch as both cars are in operation, the zone feeding relays, the zone relays and the indicating arrows are in operation to provide a signal zone for each car to indicate which button should be pressed by waiting passengers to stop the car for the direction in which they desire to travel. With car A on its up trip at the first floor, its brush 36 is disposed on the contact segment e1 thereby energizing the up direction feed relay IUY by a circuit extending from the supply conductor L+1 (Fig. 3) through the coil of relay IUY, contact segment e1, brush 36 to the supply conductor L—1. The energization of relay IUY opens its contact members IUY1 and closes its contact members IUY2, IUY3, IUY4. The opened contact members IUY1 prevent energization of the relay O. The closing of the contact members IUY2 (Fig. 4) provides a feed to the zone circuit 64, from the supply conductor L—4. The closing of the contact members IUY3 provides a feed for the zone circuit 62 from the supply conductor L+3. The closing of the contact members IUY4 (Fig. 5) energizes the zone relay IUZ by a circuit extending from the supply conductor L+6 through the coil of relay IUZ and the contact members IUY4 to the supply conductor L—6.

With car B standing at the upper terminal on a down trip, its contact brush B46 is disposed on the contact segment Bj5 (Fig. 6) thereby energizing the zone feeding relay B5DY by a circuit extending from the supply conductor L+7 through the coil of relay B5DY, contact segment Bj5 and brush B46, to the supply conductor L—7. The energization of the relay B5DY closes its contact members B5DY1, B5DY2, and B5DY3 and opens its contact members B5DY4, the opening of the contact members B5DY4 prevents the energization of the up auxiliary relay BN. The closing of the contact members B5DY3 supplies a feed from the supply conductor L+5 (Fig. 5) to the zone circuit 70. The closing of the contact members B5DY2 provides a feed from the supply conductor L+6 to the zone circuit 72. The closing of the contact members B5DY1 energizes the zone relay 5DZ by a circuit extending from the supply conductor L+5 through the coil of relay 5DZ and the contact members B5DY1 to the supply conductor L—5.

Inasmuch as the zone relay IUZ is energized by car A and the zone relay 5DZ is energized by car B, the zone relay contact members IUZ1 and IUZ2 and 5DZ1, 5DZ2 in the zone circuits 60 and 62 and 70 and 71 of car B are opened to divide the shaft travel of the cars into two signal zones so that each car has ahead of it a signal zone up to and including the next car ahead. The zone circuits 60 and 62 (Fig. 4) control the lighting of the indicating arrows for car A. The zone circuits 70 and 71 control the lighting of the indicating arrows for car B. It may be noted also that the zone circuits 63 and 64 control the lighting of the floor lanterns for car A and the zone circuits 72 and 73 control the lighting of the floor lanterns for car B.

Referring to the zone circuits 60 and 62 for the indicating arrows of car A, we find that the zone relay contact members IUZ1 are open in the circuit 60 and that the zone relay contact members 5DZ1 are opened in the zone circuit 62. Inasmuch as none of the zone feed relay contact members leading to the zone circuit 60 are closed, that circuit is not fed from the supply conductor L—3 and, therefore, none of the indicating arrows 2DM, 3DM, 4DM and 5DM is lighted for car A. Referring to the zone circuit 62, it will be noted that the zone feed relay contact members IUY3 are closed providing a feed from the supply conductor L+3 to the zone circuit 62 and, therefore, that each one of the up direction indicating arrows IUM, 2UM, 3UM and 4UM is lighted beside the up floor buttons for car A to indicate to the waiting passengers at the various floors that, if they desire to travel upwardly, they should push the floor button indicated by one of these lighted up arrows to stop the next approaching car in the up direction.

Referring to the indicating arrows for car B (Fig. 5) it will be noted that the zone relay contact members IUZ2 in the zone circuit 70 are open and that the zone relay contact members 5DZ2 in zone circuit 71 are open. It will also be recalled that the feed relay contact members B5DY3 are closed thereby energizing the zone circuit 70 to the point where it is interrupted by the open contact members IUZ2. The energized circuit 70 causes the lighting of the indicating arrows B5DM, B4DM, B3DM and B2DM at the fifth, fourth, third and second floors for the down direction thereby indicating to waiting passengers at these floors that they should press the button opposite these lighted down arrows if they desire to stop the nearest approaching car for the down direction.

Referring now to the zone circuit 71, it will be noted that none of the zone feeding relay contact members leading from the supply conductor L—5 to the zone circuit 71 are closed and, therefore, that no energy can flow through the zone circuit 71 to the up indicating arrows B1UM, etc. for car B. Therefore, all of the up indicating arrows besides the buttons for car A are illuminated to indicate the buttons to be pressed by the up passengers and all of the down indicating arrows besides the buttons for car B are lighted to indicate which buttons should be pressed by the waiting passengers to stop the nearest approaching car in the down direction.

It will be assumed now that the attendant on car A at the lower terminal closes the door (not shown), thereby closing the door and gate contact members 53, and preparing the car for an up trip. It will also be assumed that a waiting passenger who has entered the car indicates that he desires to get off at the third floor and that the car attendant thereupon presses the car button 3C to stop the car when it arrives at the third floor.

It will also be assumed that the car attendant presses the up start button UU thereby energizing the up direction switch U by a circuit extending from the supply conductor L+1 through the contact members of button UU, contact members F1, the coil of up direction switch U, the coil of inductor restoring relay H and the car and gate contact members 53 to the supply conductor L−1. The energization of the up direction switch U closes its contact members U1, U2, U3, U4, U5 and U7 and opens its contact members U6.

The closing of the contact members U5 provides a self-holding circuit for the up direction switch U. The closing of the contact members U1 and U3 energizes the generator field winding 23 by a circuit extending from the supply conductor L+1 through the contact members U1, the winding 23, contact members U3, and resistor 23R to the supply conductor L−1. The closing of the contact members U2 energizes the brake magnet 6 to release the brake 5 by a circuit extending from the supply conductor L+1 through coil 6 and the contact members U2 to the supply conductor L−1. Inasmuch as the brake 5 is released and the generator winding 23 has been energized, the generator 22 causes the hoisting motor 18 to start the car upwardly.

The closing of the contact members U4 energizes the high speed relay V by a circuit extending from the supply conductor L+1 through the contact members U4, E1 and the coil of relay V to the supply conductor L−1, thereby energizing that relay to close its contact members V1 and V3 and open its contact members V2 and V4. The closing of the contact members V1 short circuits the resistor 23R thereby accelerating the car to high speed. The closing of the contact members V3 energizes the up cancelling brush 35. The opening of the contact members V4 extinguishes the lighted lantern 1UL at the lower terminal now that the car is leaving.

The energization of the inductor restoring relay H by the operation of the up start button UM closes its contact members H1 thereby restoring the circuits for the inductor relays to such an extent that they may be energized when desired to decelerate and stop the car at a floor.

When the car button 3C was pressed by the car attendant, it was held in place by the holding coil 3CC and thereby energized the car button stopping contact segment c3 at the third floor. Therefore, as car A approaches the third floor on its up trip, its contact brush 34 engages the energized contact segments c3 and thereby energizes the car button stopping relay S by a circuit extending from the supply conductor L+2 (Fig. 3) through the contact members of button 3C contact segment c3, contact brush 34, the coil of relay S to the supply conductor L−2. The energization of the relay S closes its contact members S1 thereby energizing the decelerating inductor relay E by a circuit extending from the supply conductor L+1 through the coil of relay E and the contact members S1 and H1 to the supply conductor L−1. The closing of the contact members S1 also energized the inductor maintaining relay G to close its contact members G1 thereby establishing a holding circuit for the relay E. As the car approaches more closely to the third floor, the energized conductor relay E passes the inductor plate UE for the third floor and is thereby operated to open its contact members E1 thus deenergizing the high speed relay V and causing it to open its contact members V1 and V3 and close its contact members V2 and V4. The opening of the contact members V1 re-inserts the resistor 23R in the circuit of the field winding 23 and thereby decreases the speed of the car to stopping speed. The closing of the contact members V2 completes a circuit for energizing the stopping inductor relay F. As the car approaches more closely to the third floor, the energized inductor relay F passes the inductor plate UF and is thereby operated to open its contact members F1 thus deenergizing the up direction switch U. The deenergized up direction switch U opens its contact members U1 and U3 thereby deenergizing the field magnet winding 23 and also opens its contact members U2 to deenergize the brake magnet 6, to thereby stop the car at the third floor. As the car comes to a stop at the third floor, the car attendant opens the door and gate thereby opening the door and gate contact members 53 and permits the passenger to leave the car.

It will be assumed now that the car attendant closes the door and gate and presses the up start button UU to move the car upwardly as previously described and that the car moves to and is stopped at the upper terminal by the limit switches (not shown). It will also be assumed that a waiting passenger at the third floor desirous of making a down trip and noticing that the indicating arrow B3DM at the third floor is lighted to indicate that the button B3J should be pressed to stop the next car in the down direction, presses that button for a down trip. The pressing of the button B3J completes a circuit for energizing the down direction stop call registering relay B3DR at the third floor by a circuit extending from the supply conductor L+8 through the contact members of button B3J, the contact members BO2, the coil B3DR and conductors 75 and 76 to the supply conductor L−8. The energization of the relay B3DR closes its contact members B3DR2 and completes a self-holding circuit for that registering relay. The closing of the contact members B3DR1 immediately lights the down lantern B3DL for car B by a circuit extending from the supply conductor L+6 through the contact members B3DR1 and B3UY2 and lantern B3DL and contact members 3DZ3, 4DZ3, and B5DY2 (energized to closed position by car at upper terminal) to the supply conductor L−6. The lighting of the floor lantern B3DL indicates to the waiting down passenger at the third floor the hatchway door to which he should go and be ready to board the down car as soon as it stops and the door opens. The closing of the contact members B3DR1 also energizes the contact segment Bg3 to stop car B as it approaches within stopping distance of the third floor on its down trip.

It will be assumed now that the attendant in car B closes the car and gate and presses the down start button BDD. The pressing of the button BDD energizes the down direction switch of car B by a circuit extending from the supply conductor L+7 through the contact members of start button BDD, contact members BF2 and coil of switch BD, the coil of relay BH and the door and gate contact members B53 to the supply conductor L—7. The energized switch BD closes its contact members BD1, BD2, BD3, BD4, BD5 and BD6 and opens its contact members BD7. The closing of the contact members BD6 establishes a self-holding circuit for the switch BD. The closing of the contact members BD2 energizes the brake magnet B6 to release the brake B5. The closing of the contact members BD3 and BD4 energizes the field winding B23. Inasmuch as the field winding B23 is energized to start the generator B22 and the brake magnet B6 is energized to release the brake B5, the car starts on its down trip.

The energization of the inductor restoring relay BH also closed its contact members BH1 to restore the inductor relays to a condition ready for energization.

The closing of the contact members BD5 energizes the high speed relay BV to close its contact members BV2 and BV3 and open its contact members BV1 and BV4. The closing of the contact members BV3 short circuits resistor B23R and thereby causes the hoisting motor to run the car at high speed. The opening of the contact members BV1 extinguishes the floor lantern B5DL at the upper terminal. The closing of the contact members BV2 prepares the brush B45 for cancelling a registered call. The opening of the contact members BV4 prevents energization of the stopping inductor relay BF while the car is traveling at high speed.

As car B approaches within the slowdown stopping distance of the third floor, its down contact brush B42 engages the "live" contact segment Bg3 and thereby energizes the floor button stopping relay BT by a circuit extending from the supply conductor L+6 through the contact members B3DR1, the contact segment Bg3, contact brush B42 and the coil of relay BT to the supply conductor L—6. The energization of the relay BT closes its contact members BT1 (Fig. 6) thereby energizing the deceleration inductor relay BE by a circuit extending from the supply conductor L+7 through the coil of inductor relay BE and the contact members BT1 and BH1 to the supply conductor L—7. This circuit also energizes the inductor holding relay BG to close its contact members BG1 and thereby maintain the energized inductor relay until the car stops.

As the car approaches closer to the third floor, the energized inductor relay BE passes the down inductor plate BDE and is thereby operated to open its contact members BE2 which deenergizes the high speed relay BV causing it to close its contact members BV1 and BV4 and open its contact members BV2 and BV3. The opening of the contact members BV3 reinserts the resistor B23R in the circuit of the field winding B23 thereby decelerating the car to its stopping speed. The opening of the contact members BV2 prevents cancellation of the registered down call at the third floor or re-registration of another call for that car at that floor until the car completes its stop thereat. The closing of the contact members BV1 completes a circuit for maintaining the floor lantern B3DL at the third floor for car B in a lighted condition while the car makes the down third floor stop. This circuit will extend from the supply conductor L+6 through the contact members BV1, contact brush B43, contact segment Bg3, contact members B3UY2, floor lantern B3DL and the contact members B3DY3 to the supply conductor L—6. The closing of the contact members BV4 energizes the stopping inductor relay BF by a circuit extending from the supply conductor L+7 through the contact members BV4, the coil of relay BF and the contact members BT1 and BH1 to the supply conductor L—7.

As the car, now slowed down to stopping speed, approaches within a few inches of the third floor, the stopping inductor relay BF comes opposite the inductor plate BDF and is thereby energized to open its contact members BF2 thereby deenergizing the down direction switch BD to open its contact members BD1, BD2, BD3, BD4, BD5 and BD6 and close its contact members BD7.

The opening of the contact members BD2, BD3 and BD4 deenergizes the field winding B23 to stop the hoisting motor B18 and deenergizes the brake magnet B6 to apply the brake B5, thus stopping the car at the third floor. The opening of the contact members BF2 of the stopping inductor relay also deenergizes the inductor restoring relay BH which thereupon opens its contact members BH1 and restores the inductor relays BE and BF to their normal deenergized condition.

Car B now being stopped at the third floor, the car attendant opens the door and takes on the waiting passenger.

Returning now to consideration of the zoning system, and the lighting of the direction arrows, it will be noted that with car A standing at the upper terminal ready for a down trip, its down contact brush 46 is disposed on the contact segment j5 thereby energizing the zone feeding relay 5DY (Fig. 3) to close its contact members 5DY2 and 5DY3 and 5DY4 and opens its contact members 5DY1. The opening of the contact members 5DY1 deenergizes the up auxiliary direction relay N which closes its contact members N1 and thereby energizes the down direction auxiliary preference relay O for car A by a circuit extending from the supply conductor L+2 through the contact members 1UY1, contact members of pushbutton 9, the contact members N1 and the coil of relay O to the supply conductor L—2. The energized relay O closes its contact members O2, O3, and O4 to render effective the down registering relays connected with the floor pushbuttons 4J, 3J and 2J for car A so that down calls may be registered on these buttons for car A. When the up direction auxiliary relay N was deenergized, it opened its contact members N2, N3 and N4 thereby preventing energization of the up floor call registering relays connected with the buttons 4J, 3J and 2J during the down trip of car A.

The closing of the contact members 5DY2 (Fig. 4) provides a feed from the supply conductor L—3 to the zone circuit 60. The closing of the contact members 5DY3 provides a feed from the supply conductor L+4 to the zone circuit 63. The closing of the contact members 5DY4 (Fig. 5) energizes the down zone relay 5DZ by a circuit extending from the supply conductor L+5 through the coil of relay 5DZ and the contact members 5DY4 to the supply conductor L—5. The energized zone relay 5DZ opens its contact members 5DZ1 in the zone circuit 62 (Fig. 4) and opens its contact members 5DZ2 in the zone circuit 71 (Fig. 5).

With car B standing at the third floor on the down trip, its down contact brush B46 is disposed on the contact segment Bj3 thereby energizing the down zone feeding relay B3DY (Fig. 6) by a circuit extending from the supply conductor L+7 through the coil of relay B3DY, the contact segment Bƒ3, contact brush B46 to the supply conductor L—7. The energized relay B3DY closes its contact members B3DY1, B3DY2 and B3DY3 and opens its contact members B3DY4. The opening of the contact members B3DY4 (Fig. 5) prevents the lighting of the up floor lantern B3UL for car B at the third floor while car B is standing at that floor on a down trip. The closing of the contact members B3DY3 provides a feed from the supply conductor L+6 to the zone circuit 72. The closed contact members B3DY2 provide a feed from the supply conductor L+5 to the zone circuit 70. Th closed contact members B3DY1 energizes the down zone relay 3DZ (Fig. 5) by a circuit extending from the supply conductor L+5 through the coil of relay 3DZ and the contact members B3DY1 and BDP3 to the supply conductor L—5.

The energized zone relay 3DZ opens its contact members 3DZ1 in the zone circuit 60, opens its contact members 3DZ2 in the zone circuit 63, opens its contact members 3DZ3 in the zone circuit 72 and opens its contact members 3DZ4 in the zone circuit 70.

Referring now to car A, Fig. 4, inasmuch as the zone relay contact members 3DZ1 in the zone circuit 60 are open and that part above the contact members 3DZ1 is fed by the closed contact members 5DY2, the down direction indicating lamps 5DM at the fifth floor and 4DM at the fourth floor for car A are lighted to indicate to the waiting passengers that those buttons are effective for the nearest approaching down car; that is, car A. The circuit for the indicating arrow 4DM extends from the supply conductor L+3 through arrow 4DM, contact members 4DZ1, 5DY2 and DP2 to the supply conductor L—3. The circuit for the indicating arrow 5DM extends from the supply conductor L+3 through the arrow 5DM and the contact members 5DY2 and DP2 to the supply conductor L—3. Inasmuch as all the feeding contact members leading to the zone circuit 62 are open, none of the up direction indicating arrows 1UM, 2UM, etc. for car A is lighted.

Referring to the floor lanterns for car A, Fig. 4, inasmuch as the contact members 3DZ2 in zone circuit 63 are open and the feed contact members 5DY3 are closed, it is possible to illuminate the down floor lanterns 5DL and 4DL at the fifth and fourth floors for car A by pressing the floor buttons thereat for car A and thereby operating the registering relays. Inasmuch as the contact members 3DZ2 are open, none of the down floor lanterns for car A at the third floor and below can be lighted, because all of the feed contact members leading to the section of zone circuit 63 below the third floor are open and no circuit can be completed for these lanterns. Inasmuch as none of the feed contact members leading to the zone circuit 64 are closed none of the up floor lanterns for car A can be energized.

It will be understood from the foregoing description how the operation of the cars causes the zone relays and the zone feed relays to so maintain the signal zones of the cars that the indicating arrows correctly indicate which button should be operated to stop the nearest car in the desired direction and how the floor lanterns are rendered effective only in the signal zones and responsive only to indicated stop buttons.

To facilitate the explanation of the automatic transfer means, it will be assumed that car A is at the upper terminal floor, car B is at the third floor and that a third car, not shown, is standing at the lower terminal floor. With the assumption that a third car is standing at the lower terminal, the signal zone for car B will not extend beyond the lower floor.

It will be assumed now that the attendant on car A presses the down start button DD in car A, thereby energizing the down direction switch D to start car A downwardly in the same manner as car B was started down from the top floor.

As car A comes down to the fourth floor, it overtakes car B; that is, it comes within a predetermined distance of only one floor behind car B, and in this position its down bypass brush 40 engages the bypass contact segment ƒ3 (Fig. 4). Inasmuch as car B is standing at the third floor down, its bypass brush B41 is disposed on the contact segment Bƒ3. Therefore, the bypass relay BDP of car B is now energized by a circuit extending from the supply conductor L+3 (Fig. 4) through the contact members DP4, brush 40, segment ƒ3, conductor 77, contact segment Bƒ3, brush B41 and the coil of relay BDP to the supply conductor L—4.

The energized relay BDP opens its contact members BDP1, BDP3, BDP4 and closes its contact members BDP2 and BDP5. The opening of the contact members BDP1 prevents the completion of a circuit for energizing the transfer relay DP of car A if that car should pass car B during the present down trip. The closing of the contact members BDP2 completes a self-holding circuit for the relay BDP until car B reaches the lower floor at which time the limit switch 85 is operated to deenergize the transfer relay and restore it to its normal condition.

The opening of the contact members BDP3 (Fig. 5) prevents any current flowing to the down direction zone relays through the feeding contact members controlled by car B. The opening of the contact members BDP4 prevents lighting the down direction arrows B2DM etc. for car B. The closing of the contact members BDP5 (Fig. 6) energizes the up direction zone feeding relay B1UY by a circuit extending from the supply conductor L+7 through the contact members BDP5 to the supply conductor L—7.

Also it is assumed now that the third car (not shown) has left the lower terminal floor and moved to the upper terminal floor where it parks for the time being.

The energization of the zone feeding relay B1UY closes its contact members B1UY1, B1UY2 and B1UY3 and opens its contact members B1UY4. The closing of the contact members B1UY1 energizes the up zone relay 1UZ for the lower terminal by a circuit extending from the supply conductor L+6 (Fig. 5) through the coil of relay 1UZ and the contact members B1UY1 to the supply conductor L—6.

The energized relay 1UZ opens its contact members 1UZ1 in the zone circuit 60 (Fig. 4) leading to the zone modifying relay DK of car A, thereby preventing car A from extending its signal zone beyond the lower terminal floor toward which it is moving. The energization of relay 1UZ also opens its contact members 1UZ2 in the zone circuit 70 (Fig. 5) thereby preventing car B from energizing its zone modifying relay BDK.

The opening of the contact members B1UY4 of the energized relay B1UY deenergizes the down direction relay BO, which, in turn, closes its contact members BO4, thereby energizing the auxiliary up direction relay BN for car B by a circuit extending from the supply conductor L+8 through the contact members B5DY4, B8, and BO4 and the coil of relay BN to the supply conductor L—8. The deenergization of the relay BO opens its contact members BO1, BO2 and BO3 in the down registering relays for car B at the second, third and fourth floors, thus preventing the registration of down stop calls now that the transfer relay is in operation. The energization of the auxiliary up direction relay BN closes its contact members BN1, BN2 and BN3, thereby preparing the up direction relays for car B at the second, third and fourth floors for energization if a prospective up passenger pushes the stop button for car B at these floors.

The closing of the contact members B1UY3 (Fig. 5) provides a feed from the supply conductor L—5 by way of the closed contact members BUP4 to the zone circuit 71, which causes the up direction indicating arrows B1UM, B2UM, B3UM and B4UM to be lighted for car B. Hence it is seen that the operation of the transfer relay causes the lighting of the indicating arrows for that car away from the terminal toward which that car is moving.

The closing of the contact members B1UY2 provides a feed from the supply conductor L—6 to the zone circuit 73 thus preparing a circuit through which the up floor lanterns of car B will be lighted immediately at any floors at which prospective passengers operate the arrow indicated stop buttons of car B.

Inasmuch as car A is standing at the fourth floor on a down trip, its zone feed brush 46 is disposed on the contact segment j4, thus energizing its zone feeding relay 4DY by a circuit extending from the supply conductor L+1 through the coil of relay 4DY, contact segment j4 and brush 46 to the supply conductor L—1, thereby closing its contact members 4DY1, 4DY2 and 4DY4 and opening its contact members 4DY3. The closing of the contact members 4DY1 provides a feed from the supply conductor L—3 through the contact members DP2 to the zone circuit 60 for the down direction arrows of car A. The closing of the contact members 4DY2 provides a feed from the supply conductor L—4 to the zone circuit 63 whereby certain of the down floor lanterns for car A may be lighted if a stop call button of car A is pressed. The opening of the contact members 4DY3 prevents lighting the up floor lantern at the fourth floor while car A is standing at that floor on a down trip. The closing of the contact members 4DY4 energizes the zone relay 4DZ by a circuit extending from the supply conductor L+5 through the coil of relay 4DZ and the contact members 4DY4 and DP5 to the supply conductor L—5.

The energized zone relay 4DZ opens its contact members 4DZ1, 4DZ2, 4DZ3 and 4DZ4. The open contact members 4DZ1 limits the upper extent of the zone circuit 60 to cut off the floors behind car A. Inasmuch as the zone relay contact members 1UZ1 are open to prevent operation of the zone modifying relay DK of car A and the contact members 4DY1 and DP2 are closed, current is provided for lighting the down direction arrows 4DM, 3DM and 2DM of car A, by a circuit extending in parallel from the supply conductor L+3 through the indicating arrows, zone circuit 60 and the contact members 4DY1 and DP2 to the supply conductor L—3. Therefore, the down indicating arrows at the pushbuttons or control devices for car A at the fourth, second and third floors will indicate that waiting passengers at these floors should operate these buttons in order to stop the nearest approaching down car.

The open contact members 4DZ2 of the energized zone relay 4DZ opens the upper end of the zone circuit 63 to cut off the down lantern at the fifth floor for car A inasmuch as that car is now standing at the fourth floor. The opening of the contact members 4DZ3 in the zone circuit 72 opens that circuit for car B and inasmuch as car B now provides no feed into the zone circuit 72 below the open contact members 4DZ3, the down floor lanterns for car B at the fourth, third and second floors cannot be lighted.

The open contact members 4DZ4 in the zone circuit 70 prevents the lighting of any down direction indicating arrow for car B below the fifth floor.

In view of the foregoing, it is seen that the transferring operation causes the lighting of the down indicating arrows for car A at the fourth, third and second floors and causes the lighting of the up indicating arrows for car B at the first, second, third and fourth floors. Thus, it is seen that the transfer means provides for speeding up an overtaken car and so changing the signal zones as to prevent confusing the waiting passengers.

In order to explain the operation of the zone modifying relays, it will be assumed that the third car (not shown) is still at the upper terminal; that cars A and B are moved around to such position that car B is again on a down trip at the third floor and that car A is standing at the lower terminal. With the cars in these positions, it will be assumed that car A leaves the lower terminal and moves up to and stops at the upper terminal.

The departure of car A from the lower floor causes its brush 36 to leave the contact segment e1 and thereby deenergize its zone feeding relay 1UY, which thereupon opens its contact members 1UY4, thus deenergizing the zone relay 1UZ which, in turn, closes its contact members 1UZ2 in the zone circuit 70 and hence removes the limit on that circuit by car A. Inasmuch as car B is standing at the third floor on a down trip, its zone feed brush B46 is disposed on the down contact segment Bj3, thereby energizing the zone feeding relay B3DY, which, in turn, energizes the zone relay 3DZ. The closing of the contact members D3DY2 of the feed relay B3DY provides a feed from the supply conductor L—5 to the zone circuit 70 and the energized zone relay 3DZ opens its contact members 3DZ4 thereby shutting off that portion of the zone circuit 70 above the third floor for car B. The closing feed contact members B3DY2 and the closing of the zone relay contact members 1UZ2 establish a circuit for energizing the zone modifying relay BDK of car B at the lower terminal. The circuit for relay BDK extends from the supply conductor L+5 through the coils of relay BDK and the contact members 1UZ2, 2DZ4, B3DY2 and BDP4 to the supply conductor L—5.

The energized relay BDK closes its contact members BDK1 thereby energizing the transfer relay BDP of car B by a circuit extending from the supply conductor L+4 (Fig. 4) through the contact members of limit switch 85, the contact members BDK1 and the coil of relay BDP to the supply conductor L—4.

By the operation just described and the previously defined operation of the transfer relay, it will be appreciated that the transfer relay of a car will be operated either by the departure of a car from a terminal or by the approach of another car behind it to within a predetermined distance of it. The departure of a car from a terminal operates a zone modifying relay which in turn operates the transfer relay, but when one car approaches to within a predetermined distance of another car the transfer relay is operated by the cooperation of the contact segments and brushes of the floor selector.

Inasmuch as the transfer relay BDP of car B is now energized by the departure of car A from the terminal toward which car B is moving, it operates precisely as previously described to extinguish the down indicating arrows for car B, to light the up indicating arrows for car B in its signal zone, to prevent operation of the down floor lanterns for car B, to prepare for operation the up floor lanterns for car B, to render ineffective the down registering floor relays for car B, to render effective the up floor registering relays for car B and to prepare a circuit for lighting the down direction arrows of the next car following car B.

In view of the various operations described in connection with the cars illustrated in the drawings, it is seen that we have provided an elevator system in which only one control button for each car is necessary at each floor, that indicating devices have been provided for indicating which control button should be operated to stop the nearest approaching car in the desired direction, that the operation of an indicated control device will secure an immediate response by the lighting of a signal device or floor lantern, that transfer means are provided for speeding up a leading car when an overtaking car comes within a predetermined distance of it, and that the departure of a car from a terminal when no car is at the terminal will cause the next approaching car to advance its zone signal "around the corner" and lengthen the zone of the next succeeding car so that, although only one control button for each car is located at each floor, yet no button will have both of its indicating arrows lighted simultaneously and no confusion of the prospective passengers by mixed signals will be possible.

Although we have illustrated and described only one specific embodiment of our invention, it is to be understood that the same may be modified and changed in many ways without departing from the spirit and scope thereof.

We claim as our invention:

1. In an elevator system for operating a car past a plurality of floors, an up stop call registering means and a down stop call registering means for each floor, a control device at each floor, means responsive to conditioning of the car for an up trip for rendering the up registering means for each floor responsive to operation of the control device at that floor to register an up stop call, and means responsive to conditioning of the car for a down trip for rendering the down registering means for each floor responsive to operation of the control device at that floor to register a down stop call.

2. In an elevator system for operating a car past a plurality of floors, an up stop call registering means and a down stop call registering means for each floor, a control device at each floor, means responsive to conditioning of the car for an up trip for rendering the up registering means for each floor responsive to operation of the control device at that floor to register an up stop call, means responsive to conditioning of the car for a down trip for rendering the down registering means for each floor responsive to operation of the control device at that floor to register a down stop call, and means responsive to the registration of a stop call at a floor for stopping the car when it arrives at the floor in the direction of said registered stop call.

3. In an elevator system for operating a car past a plurality of floors, an up stop call registering relay and a down stop call registering relay for each floor, a control device at each floor, an up direction relay and a down direction relay, means responsive to operation of the up direction relay for rendering the up registering relay for each floor responsive to operation of the control device at that floor to register an up stop call, means responsive to operation of the down direction relay for rendering the down registering relay for each floor responsive to operation of the control device at that floor to register a down stop call, and means responsive to conditioning of the car for an up trip for operating the up direction relay and to conditioning of the car for a down trip for operating the down direction relay.

4. In an elevator system for operating a plurality of cars past a floor, a plurality of control devices at the floor, only one for each car, means responsive to the position and direction of operation of the cars for selectively indicating which control device should be operated to stop the nearest approaching car in the down direction and for indicating which control device should be operated to stop the nearest approaching car in the up direction, and means responsive to the operation of an indicated control device for stopping the corresponding car at the floor.

5. In an elevator system for operating a plurality of cars past a floor, a plurality of control devices at the floor, one for each car, means responsive to the operation of a control device for stopping the corresponding car at the floor, an up indicator and a down indicator associated with each control device, and means responsive to the position and direction of operation of the cars for operating the up indicator at the control device which should be operated to stop the nearest approaching car in the up direction and for operating the down indicator at the control device which should be operated to stop the nearest approaching car in the down direction.

6. In an elevator system for operating a plurality of cars past a floor, a plurality of control devices at the floor, one for each car, means responsive to the operation of a control device for stopping the corresponding car at the floor, an up indicating arrow and a down indicating arrow associated with each control device, and means responsive to the position and direction of operation of the cars for illuminating the up indicating arrow associated with the control device which should be operated to stop the nearest approaching up car and for illuminating the down indicating arrow associated with the control device which should be operated to stop the nearest approaching down car.

7. In an elevator system for operating a plurality of cars past a plurality of floors, a plurality of control devices at each floor, one for each car, means responsive to the operation of a control device at a floor for stopping the corresponding car at that floor, an up indicator and a down indicator associated with each control device, and zoning means responsive to the position and direction of operation of the cars for operating the up indicator at each floor associated with the control device at that floor which should be operated to stop the nearest approaching up car at that floor and for operating the down indicator at each floor associated with the control device at that floor which should be operated to stop the nearest approaching down car at that floor.

8. In an elevator system for operating a plurality of cars past a plurality of floors, a plurality of control devices at each floor, one for each car, means responsive to the operation of a control device for stopping the corresponding car at the floor of the operated control device, an up indicator associated with each control device at each floor, a down indicator associated with each control device at each floor, a plurality of circuits for the indicators, a plurality of zone relays for preparing the circuits for operating the indicators to indicate the control device at each floor which should be operated to stop the nearest approaching car for the up direction for that floor and for operating the indicators to indicate the control device at each floor which should be operated to stop the nearest approaching car in the down direction for that floor, and a plurality of zone feeding relays operably responsive to the position and direction of operation of the cars for operating the zone relays and for connecting the circuits prepared by the zone relays to a source of electrical energy.

9. In an elevator system for operating a plurality of cars past a plurality of floors, an up stop call registering means and a down stop call registering means for each car at each floor, a control device at each floor, means responsive to conditioning of each car for an up trip for rendering the up registering means for each floor for that car responsive to operation of the control device at that floor for that car to register an up stop call, means responsive to conditioning of each car for a down trip for rendering the down registering means for each floor for that car responsive to operation of the control device at that floor for that car to register a down stop call, and means responsive to the position and direction of operation of the cars for indicating which control device at each floor should be operated to register a stop call for the nearest approaching car in the up direction and for indicating which control device at each floor should be operated to register a stop call for the nearest approaching car in the down direction.

10. In an elevator system for operating a plurality of cars past a plurality of floors, an up stop call registering means and a down stop call registering means for each car for each floor, a control device for each car at each floor, means responsive to conditioning of a car for an up trip for rendering its up registering means for each floor responsive to operation of the control device at that floor for that car to register an up stop call, means responsive to conditioning of a car for a down trip for rendering the down registering means for that car for each floor responsive to operation of the control device for that car at that floor to register a down stop call, means responsive to the position and direction of operation of the cars for indicating the control devices at each floor which should be operated to stop the nearest approaching car in the up direction and to stop the nearest approaching car in the down direction, and means responsive to registration of a stop call for a floor for stopping the car corresponding to the registered stop call at that floor when it arrives thereat.

11. In an elevator system for operating a plurality of cars past a plurality of floors, an up stop call registering means and a down stop call registering means for each car for each floor, a control device for each car at each floor, means responsive to conditioning each car for an up trip for rendering the up registering means for each floor for that car responsive to operation of the control device at that floor to register an up stop call, means responsive to conditioning of each car for a down trip for rendering the down registering means for each floor for that car responsive to operation of the control device for that floor for that car to register a down stop call, an up indicator and a down indicator for each control device, and means responsive to the position and direction of operation of the cars for operating the up indicator at each floor for the control device at that floor which should be operated to register a stop call for the nearest approaching car in the up direction and for operating the down indicator at each floor associated with the control device at that floor which should be operated to register a stop call for the nearest approaching car in the down direction.

12. In an elevator system for operating a plurality of cars past a plurality of floors, an up signal device and a down signal device for each car at each floor, a single control device for each car at each floor, and means responsive to operation of the control device at a floor corresponding to the nearest approaching up car for immediately operating the up signal device at that floor for that car, and responsive to operation of the control device at a floor corresponding to the nearest approaching down car for immediately operating the down signal device at that floor for that car.

13. In an elevator system for operating a plurality of cars past a plurality of floors, an up signal device and a down signal device for each car at each floor, a single control device for each car at each floor, means responsive to operation of the control device at a floor corresponding to the nearest approaching up car for immediately operating the up signal device at that floor corresponding to that car and responsive to operation of a control device at a floor corresponding to the nearest approaching down car for immediately operating the down signal device at that floor for that car, and means responsive to the stopping of a car at a floor in response to an operated control device for maintaining the corresponding immediately operated signal device in an operated condition while the car stands at that floor.

14. In an elevator system for operating a plurality of cars past a plurality of floors, an up signal device and a down signal device for each car at each floor, a single control device for each car at each floor, means responsive to operation of the control device at a floor corresponding to the nearest approaching up car for immediately operating the up signal device at that floor for that car and for stopping that car when it arrives at that floor and responsive to operation of the control device at a floor corresponding to the nearest approaching down car for immediately operating the down signal device at that floor for that car and for stopping that car when it arrives at that floor.

15. In an elevator system for operating a plurality of cars past a plurality of floors, an up signal device and a down signal device for each car at each floor, a single control device for each car at each floor, an up stop call registering device and a down stop call registering device for each car for each floor, means responsive to the position and direction of operation of the cars for rendering the call registering devices for each floor corresponding to the nearest approaching car in each direction at that floor responsive to operation of the control device at that floor to register stop calls, and means responsive to the registration of a stop call on the registering device for the nearest approaching car to a floor for immediately operating the signal device at that floor corresponding to that car in the direction in which the car is approaching.

16. In an elevator system for operating a plurality of cars past a plurality of floors, an up signal device and a down signal device for each car at each floor, a control device for each car at each floor, an up stop call registering device and a down stop call registering device for each car for each floor, means responsive to the position and direction of operation of the cars for rendering the up call registering devices for the up cars responsive to operation of the control devices for the up cars for registering up stop calls, and for rendering the down call registering devices for the down cars responsive to operation of the control devices for the down cars to register down stop calls, and means responsive to the registration of a stop call for the nearest approaching up car for immediately operating the up signal device corresponding to that car at the floor of the registered up call and responsive to the registration of a stop call for the nearest approaching down car for immediately operating the down signal device corresponding to that car at the floor of the registered down call.

17. In an elevator system for operating a plurality of cars past a floor, a plurality of signal devices at the floor, one for the up direction and one for the down direction for each car, a plurality of control devices at the floor, one for each car, means responsive to the position and direction of operation of the cars for indicating which control device should be operated to stop the nearest approaching car in the up direction when it arrives at the floor and for indicating which control device should be operated to stop the nearest approaching car in the down direction when it arrives at the floor, and means responsive to operation of an indicated control device for immediately operating the signal device of the car corresponding to the indicated control device for the direction in which the car is moving.

18. In an elevator system for operating a plurality of cars past a floor, a plurality of signal devices at the floor, one for the up direction and one for the down direction for each car, a plurality of control devices at the floor, one for each car, means responsive to the position and direction of operation of the cars for indicating which control device should be operated to stop the nearest approaching car in the up direction when it arrives at the floor and for indicating which control device should be indicated to stop the nearest approaching car in the down direction when it arrives at the floor, and means responsive to operation of an indicated control device for immediately operating the signal device of the car corresponding to the indicated control device for the direction in which the car is moving and for stopping that car when it arrives at the floor.

19. In an elevator system for operating a plurality of cars past a plurality of floors, a plurality of control devices at each floor, one for each car, means responsive to the position and direction of operation of the cars for indicating at each floor which control device should be operated to stop the nearest approaching car at the floor in the up direction and for indicating at each floor which control device should be operated to stop the nearest approaching car at the floor in the down direction, a plurality of signal devices at each floor, one for the up direction for each car and one for the down direction for each car, and means responsive to operation of an indicated control device at a floor for immediately operating the signal device at that floor of the car corresponding to the indicated control device for the direction indicated by the operated indicating means for the operated control device.

20. In an elevator system for operating a plurality of cars past a plurality of floors, a plurality of control devices at each floor, one for each car, an up indicating means and a down indicating means associated with each control device, zoning means responsive to the position and direction of operation of the cars for operating the indicating means at each floor to indicate which control device at that floor should be operated to stop the nearest approaching car for that floor in the up direction and for operating the down indicating means at each floor to indicate which control device at that floor should be operated to stop the nearest approaching car for that floor in the down direction, a plurality of signal devices at each floor, one for the up direction and one for the down direction for each car, and means responsive to operation of an indicated control device for immediately operating the signal device at that floor of the car corresponding to the operated indicated control device corresponding to the direction indicated by the indicating device associated with the operated control device.

21. In an elevator system for operating a plurality of cars past a plurality of floors, an up stop call registering means and a down stop call registering means for each car at each floor, a control device for each car at each floor, means responsive to conditioning of each car for an up trip for rendering its up registering means for each floor responsive to operation of the control device at that floor for that car to register an up stop call, means responsive to conditioning of each car for a down trip for rendering the down registering means for that car for each floor responsive to operation of the control device for that car at that floor to register a down stop call, a signal device for the up direction and a signal device for the down direction for each car at each floor, means responsive to the position and direction of operation of the cars for indicating the control devices at each floor which should be operated to stop the nearest approaching car in the up direction and the nearest approaching car in the down direction, and means responsive to the registration of a stop call at a floor for immediately operating the signal device for the corresponding car in the corresponding direction at that floor and for stopping that car when it arrives thereat.

22. In an elevator system for operating a plurality of cars past a plurality of floors, an up stop call registering means and a down stop call registering means for each car for each floor, a control device for each car at each floor, means responsive to the position and direction of operation of each car for rendering its stop call registering means responsive to operation of its control devices to register stop calls in the direction of operation of the car, and means responsive to a following car approaching within a predetermined distance of a leading car for rendering ineffective the stop call registering devices of the leading car in the direction it is moving.

23. In an elevator system for operating a plurality of cars past a plurality of floors, an up stop call registering means and a down stop call registering means for each car for each floor, a control device for each car at each floor, means responsive to the position and direction of operation of each car for rendering its stop call registering means responsive to operation of its control devices to register stop calls in the direction of operation of the car, and means responsive to a following car approaching within a predetermined distance of a leading car for rendering effective the call registering devices for the leading car in a direction opposite to the direction of operation of the leading car.

24. In an elevator system for operating a plurality of cars serving a pair of terminal floors and a plurality of intermediate floors, a plurality of control devices at each floor one for each car, an up indicator associated with each control device at the lower terminal floor and at each intermediate floor, a down indicator associated with each control device at the upper terminal and at each intermediate floor, means responsive to the position and direction of operation of the cars for operating the indicators to indicate the control device at each floor which should be operated to stop the nearest approaching car for the up direction and for the down direction and means responsive to the approach of a following car to within a predetermined distance of a leading car for rendering ineffective the indicators corresponding to the leading car in the direction in which it is operating.

25. In an elevator system for operating a plurality of cars serving a pair of terminal floors and a plurality of intermediate floors, a plurality of control devices at each floor one for each car, an up indicator associated with each control device at the lower terminal floor and at each intermediate floor, a down indicator associated with each control device at the upper terminal and at each intermediate floor, means responsive to the position and direction of operation of the cars for operating the indicators to indicate the control device at each floor which should be operated to stop the nearest approaching car for the up direction and for the down direction, and means responsive to the approach of a following car to within a predetermined distance of a leading car for operating the indicators of the leading car in a direction away from the terminal toward which it is operating at each floor to the nearest car leaving that terminal.

26. In an elevator system for operating a plurality of cars serving a pair of terminal floors and a plurality of intermediate floors, a plurality of control devices at each floor one for each car, an up indicator associated with each control device at the lower terminal floor and at each intermediate floor, a down indicator associated with each control device at the upper terminal and at each intermediate floor, means responsive to the position and direction of operation of the cars for operating the indicators to indicate the control device at each floor which should be operated to stop the nearest approaching car for the up direction and for the down direction, and means responsive to the approach of a following car to within a predetermined distance of a leading car for operating the indicators of said following car for the direction in which it is moving at the floors between itself and the terminal toward which it is moving.

27. In an elevator system for operating a plurality of cars serving a plurality of terminal floors and a plurality of intermediate floors, a plurality of signal devices for each car, means responsive to the position and direction of operation of the cars for rendering effective the signal devices according to signal zones, a transfer device for each car, means responsive to the approach of a following car to within a predetermined distance of a leading car for operating the transfer device of the leading car to effect predetermined changes in the signal zones, means responsive to operation of the transfer device for maintaining it in an operative condition, and means responsive to the car associated with the operated transfer device approaching the terminal toward which it is moving when the transfer device is operated for restoring the operated transfer device to its normal condition.

28. In an elevator system for operating a plurality of cars serving a plurality of terminal floors and a plurality of intermediate floors, a plurality of signal devices for each car, means responsive to the position and direction of operation of the cars for rendering effective the signal devices according to signal zones, a transfer device for each car, means responsive to the approach of a following car to within a predetermined distance of a leading car for operating the transfer device of the leading car to effect predetermined changes in the signal zones, and means responsive to the operation of the transfer device of said leading car for preventing operation of the transfer device of said following car when said following car passes said leading car.

29. In an elevator system for operating a plurality of cars serving a pair of terminal floors and a plurality of intermediate floors, a plurality of signal devices for said cars, a plurality of zone relays for establishing circuits for the signal zones, a plurality of zone feeding relays operatively responsive to the position and direction of operation of the cars for operating the zone relays and feeding the circuits established by the zone relays, and means responsive to a following car approaching within a predetermined distance of a leading car for preventing operation of the zone relays by the zone feeding relays of the leading car.

30. In an elevator system for operating a plurality of cars serving a pair of terminal floors and a plurality of intermediate floors, a plurality of signal devices for said cars, a plurality of zone relays for establishing circuits for the signal devices in signal zones, a plurality of zone feeding relays operatively responsive to the position and direction of operation of the cars for operating the zone relays and feeding the circuits established by the zone relays, and means responsive to a following car approaching within a predetermined distance of a leading car for preventing operation of the zone relays by the zone feeding relays of the leading car.

31. In an elevator system for operating a plurality of cars serving a pair of terminal floors and a plurality of intermediate floors, a plurality of signal devices for said cars, a plurality of zone relays for preparing circuits for the signal devices in signal zones, a plurality of zone feeding relays operatively responsive to the position and direction of operation of the cars for operating the zone relays and feeding the circuits prepared by the zone relays, and means responsive to a following car approaching within a predetermined distance of a leading car for preventing operation of the zone relays by the zone feeding relays of the leading car and for operating the zone relay for the terminal floor from which said leading car is moving.

32. In an elevator system for operating a plurality of cars past a plurality of floors, an up stop call registering means and a down stop call registering means for each car for each floor, a control device for each car at each floor, means responsive to the position and direction of operation of each car for rendering its stop call registering means responsive to operation of its control devices to register stop calls in the direction of operation of that car, and means responsive to the departure of a car from a terminal floor for rendering ineffective the stop call registering devices of the nearest car approaching that terminal for the direction in which it is operating.

33. In an elevator system for operating a plurality of cars past a plurality of floors, an up stop call registering means and a down stop call registering means for each car for each floor, a control device for each car at each floor, means responsive to the position and direction of operation of each car for rendering its stop call registering means responsive to operation of its control devices to register stop calls in the direction of operation of the car, and means responsive to the departure of a car from a terminal floor for rendering effective the call registering devices for the nearest approaching car to that terminal floor in a direction opposite to the direction of operation of said approaching car at the floors between said terminal and said departing car.

34. In an elevator system for operating a plurality of cars serving a pair of terminal floors and a plurality of intermediate floors, a plurality of control devices at each floor one for each car, an up indicator associated with each control device at the lower terminal floor and at each intermediate floor, a down indicator associated with each control device at the upper terminal and at each intermediate floor, means responsive to the position and direction of operation of the cars for operating the indicators to indicate the control device at each floor which should be operated to stop the nearest approaching car for the up direction and for the down direction, and means responsive to the departure of a car from a terminal floor for operating the indicators corresponding to the nearest car approaching that terminal.

35. In an elevator system for operating a plurality of cars serving a pair of terminal floors and a plurality of intermediate floors, a plurality of control devices at each floor one for each car, an up indicator associated with each control device at the lower terminal floor and at each intermediate floor, a down indicator associated with each control device at the upper terminal and at each intermediate floor, means responsive to the position and direction of operation of the cars for operating the indicators to indicate the control device at each floor which should be operated to stop the nearest approaching car for the up direction and for the down direction, and means responsive to the departure of a car from a terminal floor for operating the indicators of the nearest car approaching that terminal away from that terminal and at each floor to said departing car.

36. In an elevator system for operating a plurality of cars serving a plurality of terminal floors and a plurality of intermediate floors, a plurality of signal devices for each car, means responsive to the position and direction of operation of the cars for rendering effective the signal devices according to signal zones, a transfer device for each car, means responsive to the departure of a car from a terminal floor for operating the transfer device of the nearest car approaching that terminal to effect predetermined changes in the signal zones, means responsive to operation of the transfer device for maintaining it in an operative condition, and means responsive to the car associated with the operated transfer device approaching the terminal toward which it is moving when the transfer device is operated for restoring the operated transfer device to its normal condition.

37. In an elevator system for operating a plurality of cars serving a plurality of terminal floors and a plurality of intermediate floors, a plurality of signal devices for each car, means responsive to the position and direction of operation of the cars for operating the signal devices according to signal zones, a transfer device for each car, means responsive to the departure of a car from a terminal for operating the transfer device of the nearest car approaching that terminal to effect predetermined changes in the signal zones, and means responsive to the operation of the transfer device for preventing operation of the transfer device of a car following said approaching car when said following car passes said approaching car.

38. In an elevator system for operating a plurality of cars serving a pair of terminal floors and a plurality of intermediate floors, a plurality of signal devices for said cars, a plurality of zone relays for preparing circuits for the signal devices in signal zones, a plurality of zone feeding relays operatively responsive to the position and direction of operation of the cars for operating the zone relays and feeding the circuits established by the zone relays, and means responsive to the departure of a car from a terminal for preventing operation of the zone relays by the zone feeding relays of the nearest car approaching said terminal.

39. In an elevator system for operating a plurality of cars serving a pair of terminal floors and a plurality of intermediate floors, a plurality of signal devices for said cars, a plurality of zone relays for preparing circuits for the signal devices in signal zones, a plurality of zone feeding relays operatively responsive to the position and direction of operation of the cars for operating the zone relays and feeding the circuits prepared by the zone relays, and means responsive to the departure of a car from a terminal for preventing operation of the zone relays by the zone feeding relays of the nearest car approaching that terminal and for operating the zone relay for the terminal floor which said departing car is leaving.

40. In an elevator system for operating a plurality of cars serving a pair of terminal floors and a plurality of intermediate floors, a plurality of signal devices for each car, means responsive to the position and direction of operation of the cars for rendering effective the signal devices according to signal zones, a transfer device for each car, means responsive to the approach of a following car to within a predetermined distance of a leading car for operating the transfer device of the leading car to render effective the signal devices of the leading car for the direction opposite to its direction of operation, and for extinguishing an operated opposite direction signal device at a floor and lighting a signal device for the direction of operation of the car when said car stops at that floor.

41. In an elevator system for operating a plurality of cars past a plurality of floors, an up signal device and a down signal device for each car for each floor, a single control device for each car at each floor, means responsive to the position and direction of operation of the cars for rendering the up signal devices effectively responsive to operation of the control device when the car is moving upwardly and for rendering the down signal devices effectively responsive to operation of the control devices when the car is moving downwardly, and means responsive to the stopping of a car at a floor for operating the signal device at that floor for the direction of travel of said car.

42. In an elevator system for operating a plurality of cars past a plurality of floors, an up signal device and a down signal device for each car for each floor, a single control device for each car at each floor, means responsive to the position and direction of operation of the cars for rendering the up signal devices effectively responsive to operation of the control device when the car is moving upwardly and for rendering the down signal devices effectively responsive to the operation of the control devices when the car is moving downwardly, a transfer means for each car, means responsive to one car approaching within a predetermined distance of another car for operating the transfer means of said other car, means responsive to the operation of the transfer means of said other car for reversing the direction of operation of the signal devices of said other car, and means responsive to the stopping of said other car at any floor for operating the signal device for its direction of operation at that floor regardless of the operation of the signal device for that car for the opposite direction at that floor.

43. In an elevator system for operating a plurality of cars serving a plurality of floors, an up signal device and a down signal device for each car at each floor, a plurality of control devices for effecting operation of the signal devices to indicate to waiting passengers at the floors which car will be next to stop for them, and means responsive to the stopping of a car at a floor for extinguishing an operated opposite direction signal device for that car at that floor and for lighting its signal device at that floor for the direction of its operation at the time of the stop.

44. In an elevator system for operating a plurality of cars serving a plurality of floors, an up signal device and a down signal device for each car at each floor, and means responsive to the stopping of a car at a floor for extinguishing an operated opposite direction signal device at that floor for that car and lighting its signal device for its direction of operation at the time of the stop, and responsive to the car leaving the stop for relighting said opposite direction signal device and for extinguishing said lighted signal device.

45. In an elevator system for operating a car past a plurality of floors, an up stop call registering relay and a down stop call registering relay for each floor, a control device at each floor, an up direction relay and a down direction relay, means responsive to operation of the up direction relay for rendering the up registering relay for each floor responsive to operation of the control device at that floor to register an up stop call, means responsive to operation of the down direction relay for rendering the down registering relay for each floor responsive to operation of the control device at that floor to register a down stop call, means responsive to arrival of the car at the lower terminal for operating the up direction relay, means responsive to arrival of the car at the upper terminal for operating the down direction relay, and means disposed for operation by the car attendant for selective operation of the direction relays.

46. In an elevator system for operating a car past a plurality of floors, an up stop call registering relay and a down stop call registering relay for each floor, a control device at each floor, an up direction relay and a down direction relay, means responsive to operation of the up direction relay for rendering the up registering relay for each floor responsive to operation of the control device at that floor to register an up stop call, means responsive to operation of the down direction relay for rendering the down registering relay for each floor responsive to operation of the control device at that floor to register a down stop call, and means disposed for actuation by the car attendant for selectively operating the direction relays.

EDGAR M. BOUTON.
HAROLD W. WILLIAMS.